US010965472B2

(12) United States Patent
Nishijima

(10) Patent No.: US 10,965,472 B2
(45) Date of Patent: Mar. 30, 2021

(54) SECURE BOOTSTRAP FOR A BLOCKCHAIN NETWORK

(71) Applicant: Hitachi, Ltd., Tokyo (JP)

(72) Inventor: Nao Nishijima, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 334 days.

(21) Appl. No.: 16/179,102

(22) Filed: Nov. 2, 2018

(65) Prior Publication Data
US 2020/0145234 A1  May 7, 2020

(51) Int. Cl.
*H04L 9/32* (2006.01)

(52) U.S. Cl.
CPC .......... *H04L 9/3268* (2013.01); *H04L 9/3236* (2013.01); *H04L 2209/38* (2013.01); *H04L 2209/64* (2013.01)

(58) Field of Classification Search
CPC . H04L 9/3268; H04L 9/3236; H04L 2209/38; H04L 2209/64; H04L 9/3263; H04L 9/0891; H04L 9/3239; H04L 9/3265
USPC ........................................................ 713/156
See application file for complete search history.

(56) References Cited

U.S. PATENT DOCUMENTS

| 2003/0028585 | A1* | 2/2003 | Yeager | H04L 67/1046 709/201 |
| 2017/0046651 | A1* | 2/2017 | Lin | G06Q 20/4016 |
| 2018/0276666 | A1* | 9/2018 | Haldenby | G06Q 20/10 |
| 2018/0343126 | A1* | 11/2018 | Fallah | H04L 9/006 |
| 2019/0080392 | A1* | 3/2019 | Youb | G06Q 40/00 |
| 2020/0184489 | A1* | 6/2020 | Negi | G06F 16/258 |
| 2020/0358782 | A1* | 11/2020 | Hager | H04L 63/20 |

* cited by examiner

*Primary Examiner* — Maung T Lwin
*Assistant Examiner* — Sanchit K Sarker
(74) *Attorney, Agent, or Firm* — Mattingly & Malur, PC

(57) ABSTRACT

In some examples, a first computing device of a first entity receives a first digital certificate from a certificate authority computing device and generates a first self-signed certificate associated with the first digital certificate. The first computing device may store the first self-signed certificate associated with the first digital certificate in a repository associated with a repository computing device. Further, the first computing device may receive a notification indicating an update by a computing device of a second entity to contents of the repository. The first computing device receives a copy of the contents of the repository including at least a second digital certificate and a second self-signed certificate associated with the second entity. The first computing device may verify the contents of the repository and generate a genesis block of a blockchain based on a result of the verifying.

20 Claims, 12 Drawing Sheets

| | | |
|---|---|---|
| 402 | ISSUED TO | |
| 404 | COMMON NAME | EXAMPLE.COM |
| 406 | ORGANIZATION | FIRST ENTITY, LLC |
| 408 | SERIAL NUMBER | 05:DF:E8:FF:63:AC:37 |
| 410 | ISSUED BY | |
| 412 | COMMON NAME | CERTIFICATE AUTHORITY |
| 414 | ORGANIZATION | CERTIFICATE AUTHORITY INC. |
| 416 | ORGANIZATIONAL UNIT | WWW.EXAMPLECA.COM |
| 418 | VALIDITY | |
| 420 | ISSUED ON 07/07/2018 | |
| 422 | EXPIRES ON 07/07/2034 | |
| 424 | FINGER PRINT | |
| 426 | SHA1 | 752C14EA195C369DEA42F458796GJ64321DE8379 |

TLS CERTIFICATE
118

*FIG. 4*

```
{
  "BlockchainNetworkName": "CA-GOLDRUSH",  ~602
  "Participants":[{  ~604
    "participant": "FirstEntity",  ~606
    "DomainName": "FirstEntity.org",
    "Permission": "Read/Write",  ~608
  },{
    "participant": "SecondEntity",
    "DomainName": "SecondEntity.org",
    "Permission: "Read",
  },{
    "participant": "ThirdEntity",
    "DomainName": "ThirdEntity.org",
    "Permission: "Read",
  }],
  "SmartContractHash": "xxxxxxxx  ~610
}
```

REQUIREMENT INFORMATION
130

*FIG. 6*

```
{
    "BlockchainNetworkName": "CA-GOLDRUSH",   ⎯ 802
    "Participants": [{                          ⎯ 804
        "participant": "FirstEntity",
        "DomainName": "FirstEntity.org",        ⎯ 806
        "Permission": "Read/Write",             ⎯ 808
        "CAcertificate": " ...(FirstEntity's self-signed certificate)..."   ⎯ 810
    },
    {
        "participant": "SecondEntity",
        "DomainName": "SecondEntity.org",
        "Permission": "Read",
        "CAcertificate": " ...(SecondEntity's self-signed certificate)..."
    }
    ...
}
```

GENESIS BLOCK
127

*FIG. 8*

SECURE BOOTSTRAP FOR A BLOCKCHAIN NETWORK

BACKGROUND

A blockchain is a type of distributed data structure that maintains a continuously growing series (i.e., a chain) of records called blocks. Each block contains a timestamp and a link to a previous block. The blocks may store transactions or other types of information. The verification process for a block may be performed fairly simply, which reduces the possibility of fraudulent transactions. By storing data distributed in multiple locations across a network, the blockchain reduces or eliminates the risks that come with data being held centrally.

In some examples, a blockchain may be permissionless (e.g., public) in which permission is not required for a participant to participate in the blockchain, for example, or permissioned (e.g., private), in which permission is required for a participant to participate in the blockchain. For example, participation of an entity in a blockchain may mean to participate in block verification, create consensus, create smart contracts, and/or operate peers or applications. Smart contracts, for example, may be computer protocols that facilitate, verify, or enforce the negotiation or performance of one or more actions, such as based on satisfaction of one or more conditions.

SUMMARY

Some examples herein include techniques and arrangements for generating a genesis block for a blockchain. For instance, a first computing device of a first entity may receive a first digital certificate from a certificate authority computing device and may receive a first self-signed certificate based on the first digital certificate. The first computing device may store the first digital certificate and the first self-signed certificate in a repository associated with a repository computing device. Further, the first computing device may receive a notification indicating an update by a computing device of a second entity to contents of the repository. The first computing device receives a copy of the contents of the repository including at least a second digital certificate and a second self-signed certificate associated with the second entity. The first computing device may verify the contents of the repository and generate a genesis block of a blockchain based on a result of the verifying.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example data structure of a certificate according to some implementations.

FIG. 6 illustrates an example data structure of requirement information according to some implementations.

FIG. 8 illustrates an example data structure of a genesis block according to some implementations.

DESCRIPTION OF THE EMBODIMENTS

Figure 1A:
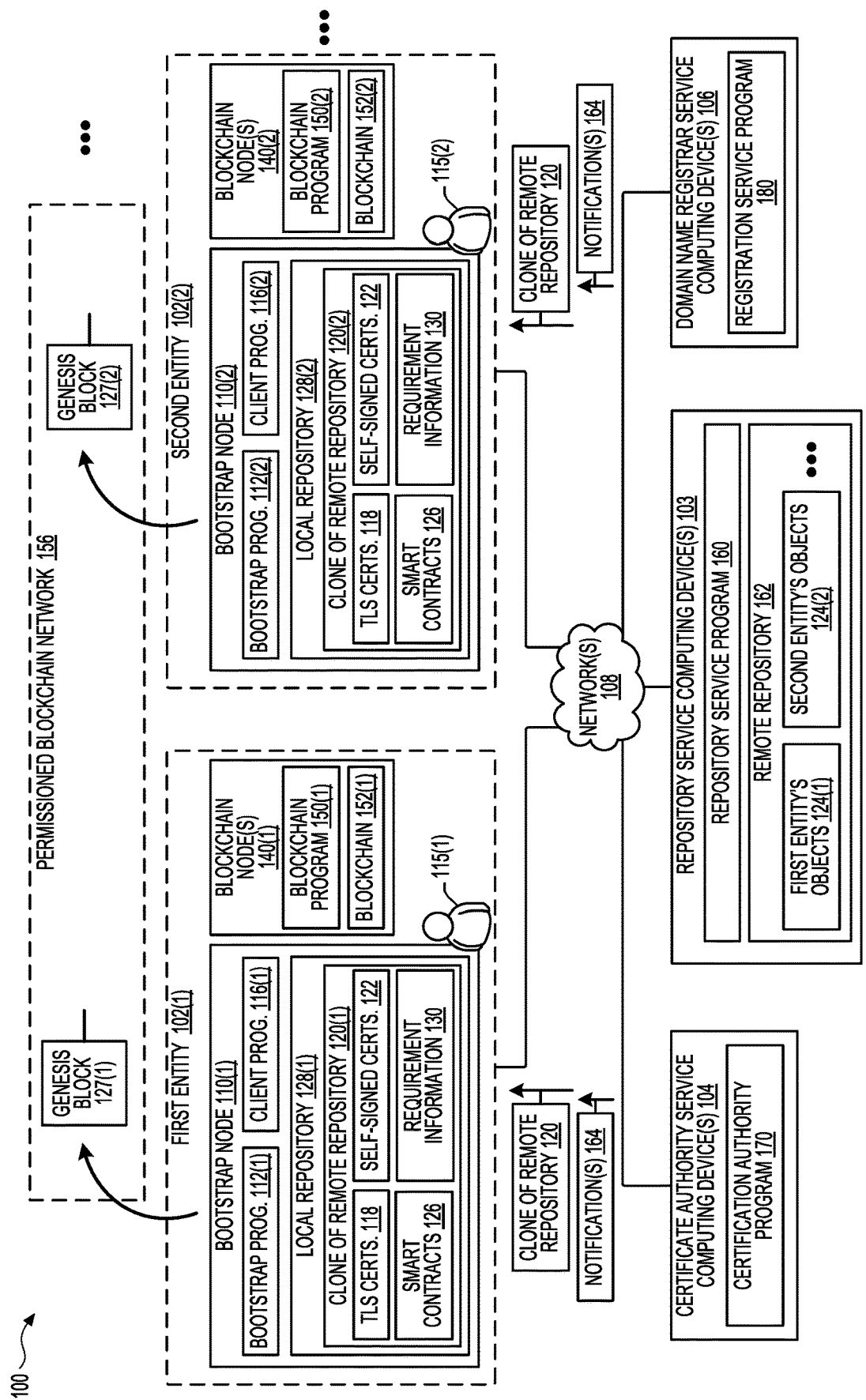
FIGS. 1A-1C illustrate example architectures of a system for secure bootstrap of a blockchain network according to some implementations.

Some implementations herein are directed to techniques and arrangements for providing a secure bootstrap for a blockchain network. For instance, bootstrap may refer to the initial setup of a blockchain for use in a blockchain network. In some examples, during the bootstrap of the blockchain network, policies and certifications may be distributed among participants. In some cases, the bootstrap herein may also include generating one or more genesis blocks, which may be configuration blocks that initialize a blockchain network and may serve as a first block of a blockchain generated or otherwise managed by the blockchain network.

In the examples herein, a permissioned blockchain may employ a certification mechanism. For instance, a genesis block that is the first block of a blockchain may include one or more certificates issued by a certificate authority (CA). An entity who will participate in the blockchain may have a certificate issued by the CA for accessing or otherwise participating in the blockchain network. However, when a certificate is self-signed, the validity of the certificate that is contained in a genesis block may need to be verified. In addition, it is possible that an entity that generates a genesis block may fake a certificate or add another's certificate to a genesis block.

To solve these problems, some examples herein provide techniques for securely generating a genesis block. To prove the validity of an entity that acts as a CA, implementations herein may enable the entity to generate a self-signed certificate that is associated with a TLS certificate (e.g., that employs organization validation or extended validation) and which may use the same public key as the TLS certificate. The TLS certificate may be issued by a trusted third party when the entity has been verified. To generate a genesis block that has been agreed to, each participating entity may add and share proposed contents on a distributed version control system (e.g., GITHUB® or the like) or, alternatively, on a public blockchain. Each entity may generate a genesis block using these contents and may subsequently verify that the generated genesis blocks are the same.

In some implementations, in a permissioned blockchain network, the identity of an entity (or entity node) may be maintained and participating entities may need to be authorized and authenticated. The security of the blockchain network may depend at least on the authentication and authorization process of the participants. A secure bootstrap may include preventing spoofing or falsification of genesis blocks by registering and verifying agreed upon information of the participating entities (entity nodes) of the blockchain. Accordingly, some implementations herein may guarantee that the content of the genesis block is not spoofed or falsified and the identities of the participants are authentic.

In some examples, generating the genesis block may include gathering a participating entity's certification file (e.g., from an offline or online source) to authenticate a participating entity. However, conventionally, it is not guaranteed that the genesis block contains certification files for only those entities for which participation has been agreed upon by the participants, and that those certification files have actually been submitted by the participants (and not spoofed or falsified, for example). Accordingly, conventionally, there is a possibility that some participants might submit a false certificate that conceals the identity of the submitter. As another example, it is possible that a smart contract being executed is not the contract actually agreed to by each entity.

As one example, to prevent these issues, a first computing device of a first entity may register one or more domain names with a domain name registrar or domain name service. Subsequently, the first computing device may obtain a Secure Socket Layer (hereinafter "SSL") certificate or a Transport Layer Security (hereinafter "TLS") certificate from a globally trusted certification authority (hereinafter "CA") or other trusted third party. In some examples, the certificate from the CA may indicate that the first entity owns and/or controls the one or more domain names registered by the first entity and/or may certify ownership of a public key by the first entity identified in the certificate. As mentioned above, implementations herein may employ organization verification or extended verification with a TLS certificate, which verifies the right of each entity to administratively manage the entity's domain name and/or verifies the entity's actual existence as a real entity.

The public key for the TLS certificate may correspond to a private key of the first entity to make up a public-private key pair for the first entity. The first computing device may use the private key to generate a self-signed certificate that uses the same public key as the TLS certificate. Accordingly, the TLS certificate may be used to verify that the entity that issued the self-signed certificate is the same entity as that which owns, and is identified in the TLS certificate.

Further, a second computing device of the first entity that communicates with the first computing device may receive the self-signed certificate for use as a self-signed root certificate authority and may execute a self-signed certificate program to issue user-requested certificates for performing blockchain transactions, or the like. The user-requested certificates may be verified based on the TLS certificate received from the globally trusted CA service and the self-signed certificate, which both use the same public key corresponding to the private key of the first entity.

In addition, an administrator or other user associated with the first entity may access a repository service, such as a web-based hosting service, a file-storage and synchronization service, a permissionless (e.g., public) blockchain, or the like. In some instances, the administrator or other user at each entity may create an account for accessing the repository service or may otherwise take steps to access the repository service. As one example, in the case that the repository is incorporated into a permissionless blockchain, the user may create an account to interact with the permissionless blockchain and/or may configure a smart contract to be implemented on the permissionless blockchain.

For instance, in the case of a smart contract, the smart contract may be configured to create a record on a blockchain, which describes an agreement with consensus from the entities participating in the blockchain network. For instance, the smart contract may be executed to automatically trigger certain operations, such as on other computing devices when a specified condition for performing a transaction is detected, and the transactions may be recorded on the blockchain.

In some cases, the first computing device may generate contents or other first entity objects for placement in the repository and may push or otherwise send the generated first entity objects to the remote repository maintained by the repository service. The respective computing devices of the other participating entities may also have access to the repository service and may have access to the remote repository. Additionally, the respective computing devices of other participating entities may clone (i.e., copy) the repository contents stored on the repository service and receive update notifications from the repository service indicating an update to the remote repository. Further, the first computing device may commit or store the contents of the generated repository to a local storage repository and may push or otherwise send the contents of the local storage repository to the repository service.

In some cases, the repository service may send an update notification to, or may otherwise notify one or more of the participating entities when an update to the contents of the remote repository stored on the repository service has occurred. An update may include a modification to the contents such as an addition or a deletion to a portion of the contents. For example, when a participant adds objects for verification to the remote repository, the repository service may send a notification to the other participating entities to notify the other participating entities of the update.

The computing devices of the each of the participating entities may be configured to push or otherwise send the contents of their own locally generated repository to the remote repository stored on the repository service. In response to each participating entity providing its repository objects to the remote repository, an update notification may be sent to the other participating entity computing devices, including the first computing device. In some examples, the respective computing devices of the other participating entities may push the contents of their local repository to the remote repository in response to receiving the update notification. Further, the first computing device and other participating entity computing devices may request or otherwise send an instruction to receive a clone of the remote repository or, in some examples, may automatically receive a clone of the remote repository upon receiving an update notification, or as the update notification.

In some implementations, after receiving a clone of the remote repository, the first computing device verifies that respective requirement information of each participating entity exists in the local repository of the first computing device. If not, then the first computing device waits for another update notification and requests to receive a clone of the remote repository. For example, the requirement information may include a name of the participating entity, permissions the entity has, and a domain name of the participant. Once the first computing device verifies that all of the requirement information of each participating entity exists in the local repository, then the first computing device may verify information of the contents of the local repository including the requirement information. In some examples, if all the information in the local repository matches the requirement information, then the first computing device may execute a process to generate a genesis block.

The respective computing devices of each participating entity may also execute individual processes to generate genesis blocks for their own blockchains after completing respective verifications of their own local repositories. Further, the first computing device may receive the genesis blocks generated by the computing devices of the other participating entities and may then compare or otherwise verify the information of each respective genesis block with the other respective genesis blocks, including its own.

Some examples herein apply in the environment of blockchain systems that include a plurality of blockchain node computing devices (hereinafter "blockchain nodes"). The blockchain nodes may be configured to add, to the blockchain, transaction data as new blocks that are added to respective instances of a blockchain managed by each respective blockchain node. The implementations herein are not limited to the particular examples provided, and may be extended to other blockchain applications, other types of transactions, other types of related data, other types of computing systems, other system architectures, and so forth, as will be apparent to those of skill in the art in light of the disclosure herein.

Figure 1B:
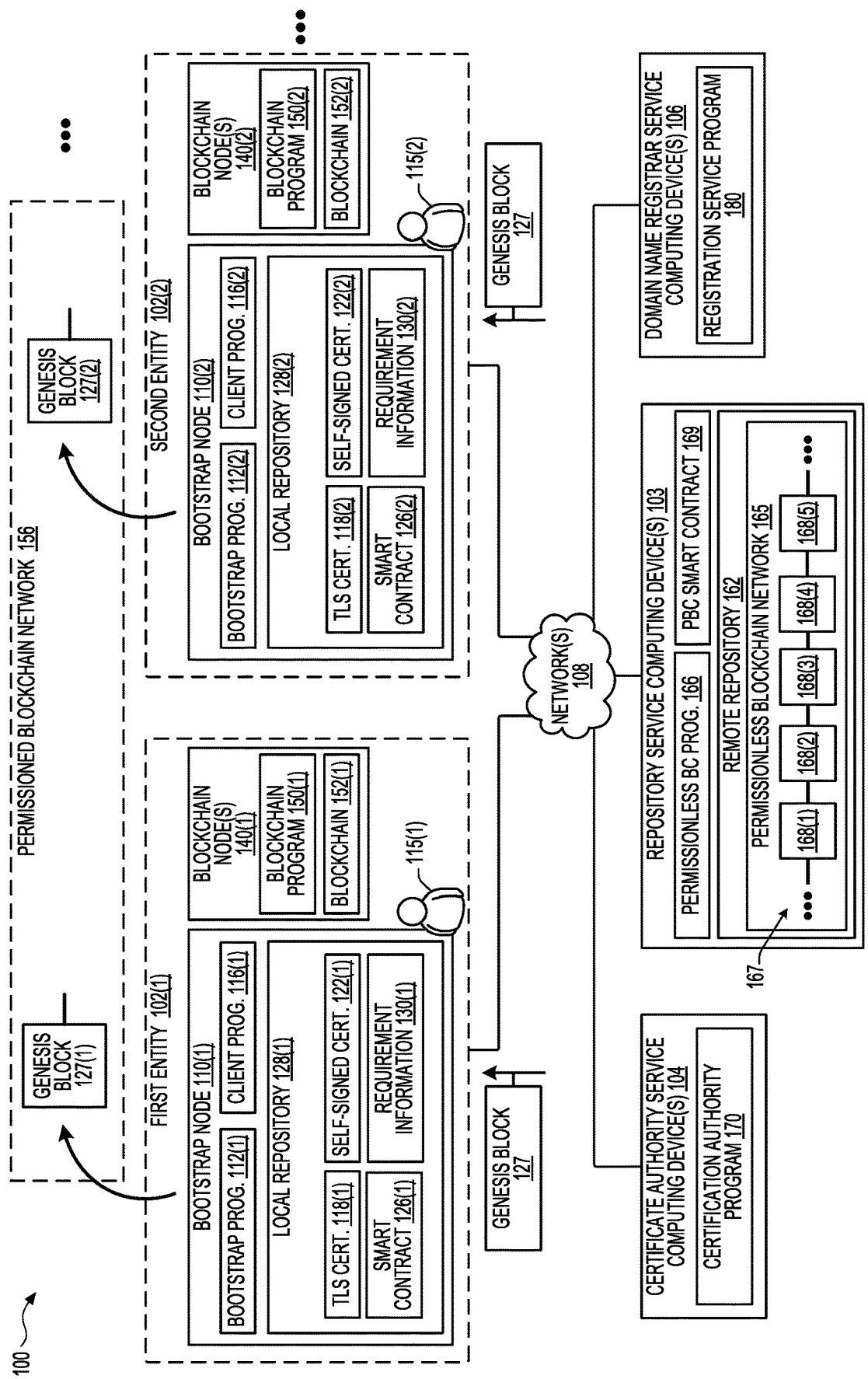
Figure 1C:
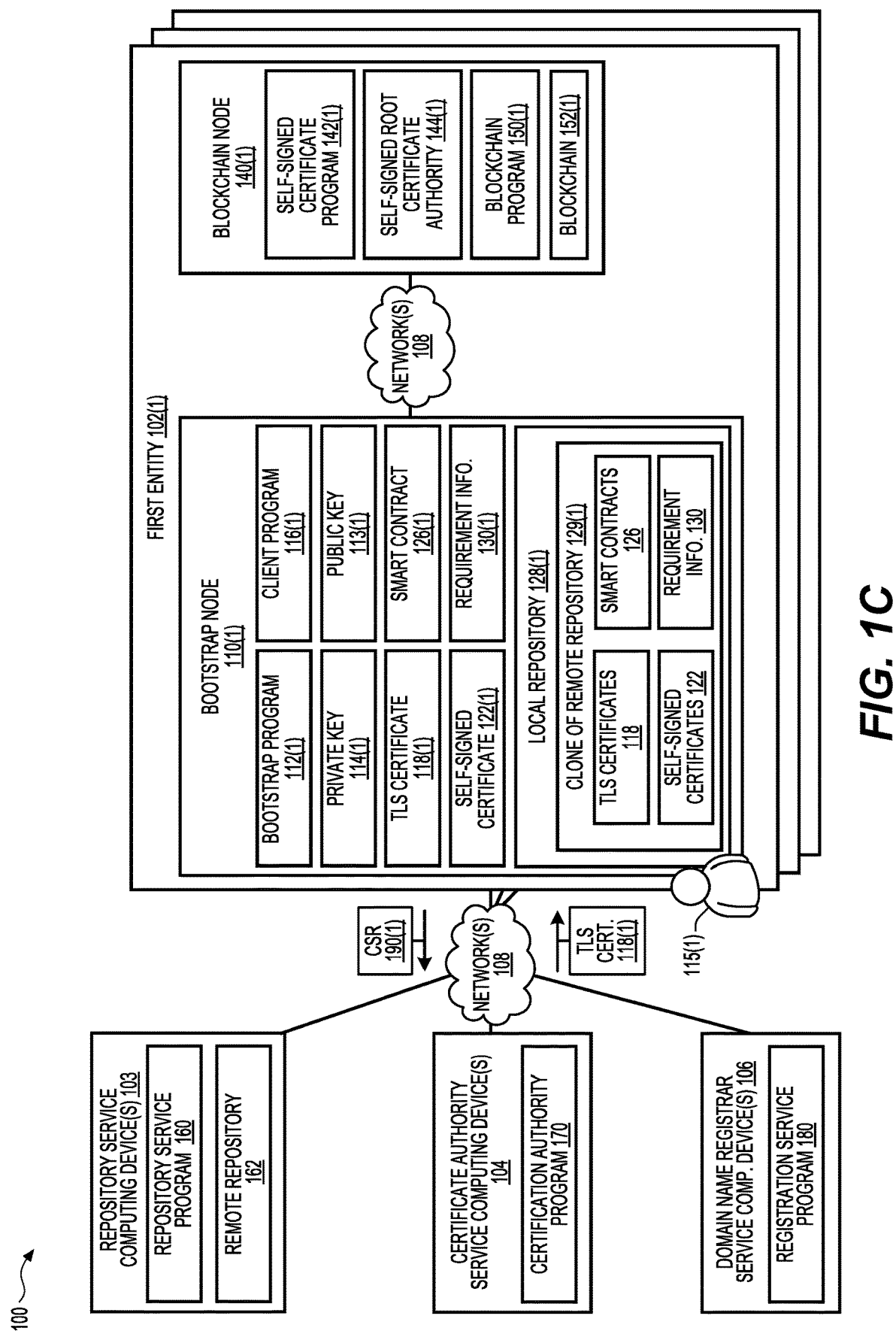

FIGS. 1A-1C illustrate example architectures of a system 100 for secure bootstrap of a blockchain network according to some implementations. FIG. 1A illustrates a first entity 102(1) that includes one or more computing devices, such as a bootstrap node computing device 110(1) ("bootstrap node") and one or more blockchain node computing devices 140(1) ("blockchain node(s)") The bootstrap node 110(1) includes a bootstrap program 112(1) and a client program 116(1). In addition, the bootstrap node 110(1) includes a local repository 128(1) that is able to receive a clone 120(1) of a remote repository. As discussed additionally below, the clone of the remote repository may include various objects, such as TLS certificates 118, self-signed certificates 122, smart contracts 126, and requirement information 130.

In addition, the blockchain node(s) 140(1) may include a blockchain program 150(1) that enables the blockchain node 140(1) to participate in a blockchain network, such as a permissioned blockchain network 156 in this example. For instance, the blockchain program 150(1) may executed by the respective blockchain node to generate and maintain one or more blockchains 152(1). As discussed below, a genesis block 127(1) for the blockchain 152(1) may be securely generated by the bootstrap node 110(1) based at least in part on verification of specified information.

An administrator or other user 115(1) associated with the first entity 102(1) may execute the client program 116(1) on the bootstrap node 110(1) for interacting with the bootstrap program 112(1). In some cases, the user 115(1) may access the bootstrap node 110(1) directly, while in other cases, the user 115(1) may execute the client program 116(1) on a separate computing device (not shown in FIG. 1), and thus, may be located remotely from the bootstrap node 110(1).

There may be a plurality of entities 102 participating in the permissioned blockchain network 156. FIG. 1A illustrates a second entity 102(2) that includes computing devices, functional components, and data the same as or similar to those discussed above with respect to the first entity 102(1), and a second user 115(2) associated with the second entity 102(2).

In some configurations, each of the bootstrap node 110(1) and the blockchain node 140(1) may be the same computing device or, alternatively, may be separate computing devices, multiple separate computing devices, or any other possible combination thereof. As one example, the bootstrap node 110(1) may be a physically separate computing device from the blockchain node 140(1). As still another example, some or all of the functionality of the bootstrap node 110(1) and the blockchain node 140(1) may be distributed among a plurality of separate computing devices in any desired manner Numerous other variations will be apparent to those of skill in the art having the benefit of the disclosure herein. Additional details of the bootstrap node 110(1), the blockchain node 140(1) and their various functions are discussed below.

In this example, the bootstrap nodes 110(1), 110(2), . . . , and the blockchain node(s) 140(1), 140(2), . . . , may be able to communicate with each other over one or more networks 108, as well as with a plurality of other computing devices. For instance, at least the bootstrap nodes 110(1), 110(2), . . . , are able to communicate with one or more certificate authority (CA) service computing devices 104 of a globally trusted certificate authority service; one or more domain name registrar service computing devices 106 of a domain name registrar service; and one or more repository service computing devices 103 of a repository service.

The CA service computing device(s) 104, the domain name registrar service computing device(s) 106, and the repository service computing device(s) 103 may be implemented as one or more servers and/or a distributed architecture having multiple computing devices (not shown in FIG. 1). Numerous other variations will be apparent to those of skill in the art having the benefit of the disclosure herein. Additional details of the computing devices 103, 104, and 106, and their various functions, are discussed below.

The one or more networks 108 may include any suitable communication technology, including a wide area network, such as the Internet; a local area network, such as an intranet; a wireless network, such as a cellular network; a local wireless network, such as Wi-Fi; short-range wireless communications, such as BLUETOOTH®; a wired network including Fibre Channel, fiber optics, Ethernet, or any other such network, a direct wired connection, or any combination thereof. Thus, the network(s) 108 may include wired and/or wireless communication technologies. The protocols used to communicate over such networks are well known in the art and will not be discussed in detail in this disclosure.

The blockchain program 150 executed on each blockchain node 140 may configure the respective blockchain node 140 to manage one or more respective blockchains 152. For instance, the blockchain program 150 may be executed to maintain and add to the blockchain 152 following generation of the respective genesis block 127 for the respective blockchain 152. Accordingly, each blockchain node 140 may participate in the permissioned blockchain network 156 that includes a plurality of the blockchain nodes 140.

In some examples, the permissioned blockchain network 156 provided by the system 100 may be a private scalable, decentralized peer-to-peer system able to generate and maintain the blockchain 152 or other blockchains (not shown in FIG. 1). The integrity of the data maintained in the blockchain 152 may be based on a consensus mechanism rather than, e.g., a mere trust-based infrastructure. In examples herein, "consensus" may refer to a collective decision-making process or agreement as to what is true or false. For instance, the blockchain network 156 in the system 100 may provide a distributed consensus network made up of the participating block chain nodes 140, which may serve as consensus nodes. The various different consensus nodes participating in the blockchain network 156 in the system 100 may exchange a series of blockchain communications to come to a consensus, such as based on a proposal by one blockchain node 140 and an endorsement of the proposal by one or more other ones of the blockchain nodes 140. In some cases, individual blockchain nodes 140 may contribute their own data to enable the blockchain network 156 as a whole to achieve a collective agreed-upon decision. In some examples, the consensus may be determined based on proof-of-work of a participating node 140 or proof-of-stake.

The blockchain network 156 in the system 100 is configured to record data as successive blocks in the blockchain 152, which serves as a distributed ledger or other distributed data structure for storing data. As a result, the data is securely and immutably recorded in the blockchain 152 and is practically unalterable. All the blockchain nodes 140 in the system 100 may execute instances of the same blockchain program 150. When a consensus is reached for a particular block, the blockchain nodes 140 may each record that block to their respective instances of the blockchain 152. Accordingly, each of the blockchain nodes 140 may maintain its own complete copy of the blockchain 152.

In some examples, the decentralized peer-to-peer nature of the blockchain network 156 in the system 100 herein may help prevent any single user, group of users, or other entity from controlling the underlying infrastructure or undermining the integrity of the blockchain network 156. For instance, the entities may be individuals, groups, corporations, state actors, organizations, and so forth, or a combination of any these entities. In some examples herein, the system 100 may be private (i.e., not generally accessible to the public) and the bootstrap nodes 110 and blockchain nodes 140 may typically be owned by, operated by, or otherwise associated with one or more of the entities 102. In other cases, some or all of the blockchain nodes 140 may be associated with a third party who provides the blockchain network 156 as a service. Numerous other variations will be apparent to those of skill in the art having the benefit of the disclosure herein.

In some implementations, the repository service computing device(s) 103 may include a repository service program 160 the may be executed on the repository service computing device(s) 103 to provide a web-based open-source platform providing distributed version control and code management. For example, users of the repository service computing device(s) 103, such as first entity 102(1), may create an account for using the platform, may initialize shared data stores, such as repositories, and may manage versions of file contents such as code, text documents, and the like. One or more individual users or computing devices associated with the first entity 102(1) may access and have authority to read and write or otherwise change the contents associated with the account created with the first entity 102(1). Further, in some implementations, the repository service computing device(s) 103 may include a public file storage and synchronization service that allows users or computing devices associated with the first entity 102(1) to create an account, store files on respective servers of the service, synchronize files, and share files among those associated with the first entity 102(1), and having permission or authority to read, write, and/or otherwise change the contents associated with the account created with the first entity 102(1).

As an example, the bootstrap node 110(1) associated with the first entity 102(1) may create an account with the repository service computing device(s) 103, and the account information may be distributed to the other participating entities, such as second entity 102(2). Further, in some implementations, the repository service computing device(s) 103 may manage, initiate, and store data to the remote repository 162, receive files and other information from the participating entities 102, store the received information to the repository 162, and send update notifications 164 and/or a clone of the remote repository 162 to the participating entities 102.

The repository service program 160 may be executed by the repository service computing device(s) 103 to implement and manage a remote repository 162, and may manage changes, such as additions and deletions to the remote repository 162 or other storage (not shown in FIG. 1) as made by participating entities 102. Further, the repository service program 160 may be executed to manage synchronization of information including data and code, for example, across computing nodes that may have access to the repository service computing device(s) 103. Additionally, the repository service program 160 may issue or otherwise send notifications 164 indicating a status of, or an update to, the remote repository 162. For example, the repository service computing device(s) 103 may send a clone (i.e., a copy of the contents) of the remote repository 162 to one or more of the participating entities, such as first entity 102(1) and second entity 102(2).

In addition, the repository service program 160 may send a clone 120 (i.e., a copy of the contents) of the remote repository 162 to one or more of the participating entities, such as the first entity 102(1) and the second entity 102(2). The receiving entities 120 may place the received clone 120 in their respective local repositories, and may perform a verification process on the respective clone 120 prior to generating a genesis block 127 for the blockchain 152. Contents of the remote repository 162 may include first entity objects 124(1), second entity objects 124(2), and so forth. The objects added by each entity to the remote repository 162 may include a TLS certificate 118, a self-signed certificate 122, a smart contract 126, and requirement information 130, each of which is discussed additionally below.

According to some examples, the domain name registrar (DNR) service computing device(s) 106 may provide a web-based service that may have the authority to register domain names in a generic top-level domain (gTLD) or otherwise, such as an Internet Corporation for Assigned Names and Numbers (ICANN)-accredited registrar. In some examples, a registration program 180 may be executed on the DNR service computing device(s) 106 to receive and manage a registration request that may include information necessary to register a domain name Additionally, the registration service program 180 may configure the DNR service computing device(s) 106 to issue or otherwise send notifications including an indication of a successful domain name registration to the one or more participating entities 102.

Further, in some examples, the CA service computing device(s) 104 may execute a CA program 170 that provides a web-based CA service that issues digital certificates that may certify ownership of a public key by the named subject of the certificate. The CA service acts as a trusted third party and may issue certificates that are specified by the X.509 standard, which is a standard that defines the format of public key certificates, or various other suitable standards. The X.509 standard is defined by the International Telecommunications Union's Standardization sector (ITU-T), and is based on ASN.1, another ITU-T standard. In some implementations, the CA program 170 may configure the CA service computing device(s) to issue one or more digital certificates. For example, the CA program 170 may manage certification of the ownership of a public key by a named subject of the certificate. A named subject of the certificate may be the name or business entity name of a participating entity 102, such as the first entity 102(1) and the second entity 102(2). In addition, the CA program 170 may configure the CA service computing device(s) to digitally sign a certificate that may be issued by the CA program 170 using a private key of the globally trusted CA service computing device(s) 104. Further, the CA program 170 may be executed to issue or otherwise notify one or more participating nodes of a successful certification and may issue or otherwise send a TLS certificate to one or more of the entities 102.

In some examples, the programs described herein, such as the bootstrap program 112, the client program 116, the blockchain program 150, the CA program 170, the repository service program 160 and/or the registration service program 180 may communicate with each other directly and/or through one or more application programming interfaces (APIs). Accordingly, implementations herein are not limited to any protocol or other technique for communication between the various programs. Furthermore, while the programs 112, 116, 150, 160, 170, and 180 are illustrated for convenience of discussion, it will be apparent to those of skill in the art that more or fewer programs may be executed in the examples herein for performing the functionality described herein.

In the illustrated example, each participating entity 102, as discussed additionally below, may receive or may generate entity objects 124, including a TLS certificate 118, a self-signed certificate 122, a smart contract 126, and requirement information 130. The entity 102 may deposit or otherwise send these objects 124 to the remote repository 162. The entities 102 may receive a notification 164 when another entity 102 has deposited its objects 124 in the remote repository 162.

When all participating entities 102 have sent their objects to the remote repository 162, each of the participating entities 102 may receive a clone 120 (i.e., a copy of the contents) of the remote repository and may deposit the clone of the remote repository in its own local repository 128. Each participating entity 102 may perform a verification process on the objects in its own local repository 128. If the objects are all verified, the participating entity may generate a respective genesis block 127 for the blockchain 152 based at least in part on the verified objects. For example, the first entity 102(1) may generate a genesis block 127(1) used by the blockchain node 140(1) for the blockchain 152(1), and the second entity 102(2) may generate a genesis block 127(2) used by the blockchain node 140(2) for the blockchain 152(2). In addition, each entity 102 may check and verify the genesis blocks 127 of each of the other blockchain nodes 140. Accordingly, each of the entities can verify that the genesis blocks 127, and thereby the blockchain network 156 have been created properly.

FIG. 1B illustrates an example architecture of the system 100 according to some implementations. In this example, a permissionless blockchain network 165 may serve as the remote repository 162. For example, the repository service computing device(s) 103 may execute a permissionless blockchain (BC) program 166 that may generate and maintain an open-source permissionless (e.g., public) blockchain 167 that includes a plurality of blocks . . . 168(1), 168(2), 168(3), 168(4), 168(5), . . . . Accordingly, the permissionless blockchain program 166 may implement and manage blockchain nodes (not shown in FIG. 1B) associated with the permissionless blockchain network 165, that participate in the permissionless blockchain network 165, and which may include a plurality of blockchain nodes.

The entities 102 may deposit their objects, such as the TLS certificate 118, a self-signed certificate 122, a smart contract 126, and requirement information 130 to one of the blocks 168 in the permissionless blockchain 167. For example, suppose that the first entity 102(1) registers its objects 118(1), 122(1), 126(1), and 130(1) from its own local repository 128(1) with the repository service computing device(s) 103, and the permissionless blockchain program 166 generates a new block on the blockchain 167, such as block 168(2). Subsequently, suppose that the second entity 102(2) registers its objects 118(2), 122(2), 126(2), and 130(2), resulting in the generation of an additional block on the blockchain 167, e.g., block 168(4).

A permissionless blockchain (PBC) smart contract 169 on the permissionless blockchain network 165 may be configured to check and verify each of the entities' objects added to the permissionless blockchain 167, e.g., in blocks 168(2) and 168(4) in this example. If the objects are verified, in some examples, the PBC smart contract 169 may be configured to generate the genesis block 127 based on the objects, and register the genesis block to the permissionless blockchain 167, e.g., at block 168(5). In these examples, each of the entities 102 may access the blockchain 167 and may retrieve the genesis block 127. Each of the entities 102 may use the retrieved genesis block 127 as its respective genesis block 127(1), 127(2), and so forth. Accordingly, in these examples, the PBC smart contract 169 is executed at the repository service computing device 103 for performing verification. The PBC smart contract 169 may be stored on a block in a blockchain in the permissionless blockchain network 165. To execute the smart contract, one of the entities may send an execution request to permissionless blockchain network 165 following provision of the entity's objects to the repository service computing device 103.

In some implementations, the permissionless blockchain 167 may be capable of storing data including transaction data and smart contracts, and to enable execution of smart contracts, such as the PBC smart contract 169. The repository service computing device(s) 103 may also include a blockchain application platform (not shown in FIG. 1B). One example of such a permissionless blockchain application platform may be ETHEREUM®. For example, the bootstrap node 110(1) and/or blockchain node 140(1) may communicate with the permissionless blockchain network 165 of the repository service computing device(s) 103.

In some examples, the PBC smart contract 169 may be implemented and executed on the permissionless blockchain 167. The PBC smart contract 169 may be configured to include conditions for performing a verification process such as by incorporating the conditions executed in process 700 as discussed with respect to FIG. 7 below. The smart contract function of the permissionless blockchain 167 may enable the bootstrap node 110(1) of the first entity 102(1) to configure the PBC smart contract 169 to include a series of conditions or operations as set forth in process 700. For example, the PBC smart contract 169 may cause one or more nodes of the permissionless blockchain network 165 to determine each condition of process 702, 704, 706, 708, 710, and 712. Additionally, or alternatively, the PBC smart contract 169 may communicate with the first entity 102(1) to notify the bootstrap node 110(1) to execute the bootstrap program 112(1) to execute one or more of the verification operations of verification process 700.

Further, in some implementations, the permissionless blockchain 167 of the repository service computing device(s) 103 may include functionality to manage, initiate, and store the remote repository 162, receive update filed and other information from the participating entities 102 for storage in the remote repository 162, i.e., by storing the received information in the permissionless blockchain 167, and send update notifications and/or a clone of the entity objects stored in the remote repository to the participating entities 102. For example, the participating entities may add entity objects such as the TLS certificate 118, the self-signed certificate 122, the smart contract 126, and the requirement information 130 to the permissionless blockchain 167. Additionally, once the verification processes are executed by the PBC smart contract 169, the information included in the permissionless blockchain 167 may be used to generate a secure genesis block 127 for building the permissioned blockchain network 156. In some cases, the PBC smart contract 169 may be executed to generate the genesis block and distribute the genesis block to the blockchain nodes of the participants. In other cases, the bootstrap node 110 of each entity 102 may execute the bootstrap program to generate its own genesis block upon receipt of an indication that the PBC smart contract has verified the contents of the relevant blocks of the permissionless blockchain 167.

FIG. 1C illustrates an example architecture of the system 100 according to some implementations. In this example, the repository service computing device(s) 103, the CA service computing device(s) 104, the DNR service computing device(s) 106, the bootstrap node 110(1), and the blockchain node 140(1), may communicate with each other and/or with respective computing devices of one or more other entities 102 over the one or more networks 108. In addition, the bootstrap node 110(1) includes a private key 114(1), the TLS certificate 118(1), a smart contract 126(1), the local repository 128(1), and the requirement information 130(1). As mentioned above, the private key 114(1) may correspond to a public key 113(1) to constitute a public-private key pair.

In some cases, the user 115(1) may use the client program 116(1) associated with the first entity 102(1) for making agreements, conducting transactions, etc., with users 115 of one or more other entities 102 participating in the system 100. Further, the bootstrap program 112(1) or another suitable program associated with the first entity 102(1) may generate or otherwise obtain a cryptographic key pair (according to public-key cryptography methods) including a private cryptographic key (i.e., the private key 114(1)) and a public cryptographic key (i.e., the public key 113(1)) using RSA (Rivest-Shamir-Adlemand) or other suitable method.

Initially, if it does not already have one, the bootstrap node 110 may request a domain from the domain name registrar service computing device 106. In response, the bootstrap node may receive a domain name. The private key 114(1) may be created or otherwise received by the bootstrap program 112(1) before or at the time at which a certificate signing request (CSR) 190(1) is created. Further, the CSR 190(1) may be, or may include, the public key 113(1), which may be generated or otherwise received by the bootstrap program 112(1) and which corresponds to the private key 114(1). The CSR may be used during the certificate enrollment process because the CSR validates specific information about the first entity, such as domain name.

The bootstrap program 112(1) may be executed to send the CSR 190(1) to the globally trusted CA service computing device(s) 104 to request a TLS certificate (e.g., OV or EV). The CA service computing device 104 uses the CSR 190(1) to create and/or certify the public key 113(1) to match the private key 114(1) without compromising the private key itself, i.e., the CA service computing device 104 never has access to the private key 114(1). The public key 113(1) is incorporated into the TSL certificate 118(1) and sent to the bootstrap node 110(1). The TLS certificate may be used to certify that the domain owner is the entity named in the TLS certificate 118(1) and may include a rigorous identity check on the entity applying for the TLS certificate 118(1). In other words, the public key 113(1) which is identified by the TLS certificate 118(1), and which forms a key pair with the private key 114(1) may be certified based at least partially on an identity check by the CA service computing device 104.

Following receipt of the TLS certificate 118(1), the bootstrap node 110(1) generate the self-signed certificate 122(1) using the private key 114(1). Accordingly, the public key for the self-signed certificate 122(1) is the same as the public key for the TLS certificate. Therefore, the self-signed certificate 122(1) may be certified based on the TLS certificate 118(1), which certifies the identity/authenticity of the first entity 102(1) based on the TLS certificate 118(1) issued by the CA service computing device 104.

The client program 116 associated with the first entity 102(1) may be executed to manage the local repository 128(1) of the bootstrap node 110(1), such as by adding, deleting, or changing information as necessary. Initially, the client program 116 may add the TLS certificate 118(1), the self-signed certificate 122(1), the smart contract 126(1), and the requirement information 130(1) to the local repository 128(1). The client application 116(1) may be configured to send the objects in the local repository 128(1) to the remote repository 162 on the repository service computing device(s) 103. Subsequently, the bootstrap node 110(1) may receive a clone of the remote repository including the objects added by the first entity 102(1), as well as the objects added by other entities 102 participating in the permissioned blockchain network discussed above.

The bootstrap program 112(1) associated with the first entity 102(1) may verify the clone 129(1) of the remote repository in the local repository 128(1), including the requirement information 130 of the respective participating entities 102 and the information for the respectively generated genesis blocks. The bootstrap program 112(1) associated with the first entity 102(1) may generate a genesis block (not shown in FIG. 1C) using information that may include the TLS certificates 118, self-signed certificates 122, the smart contracts 126 (or at least a hash value thereof), and the requirement information 130.

In the example, of FIG. 1C, the blockchain node 140(1) includes a self-signed certificate program 142(1) and a blockchain program 150(1). For example, the self-signed certificate program 142(1) may use the self-signed certificate 122(1) as a self-signed root certificate authority 144(1) to generate user requested certificates (not shown in FIG. 1C) that may be used to interact with the blockchain 152. The TLS certificate 118(1) may be used to certify that the entity using the self-signed certificate program 142(1) to generate the user requested certificates is in fact the same as the entity identified in the self-signed certificate 122(1) and the TLS certificate 118(1). As one example, the self-signed certificate program 142(1) may be an open-source system for automating deployment, scaling, and management of containerized applications. The self-signed certificate program 142(1) may issue a certificate file for accessing the permissioned blockchain 152. To avoid spoofing, the self-signed certificate program 142(1) may communicate to a user securely using the TLS certificate 118(1). The blockchain program 150(1) may interact with and build the permissioned blockchain network after the genesis block has been generated.

In the permissioned blockchain 152, to limit participants, a genesis block may include the self-signed certificates 122 of each participating entity. Each entity that has a self-signed certificate 122 included in the genesis block may be able to interact with the blockchain 152 based on user requested certificates generated by the self-signed certificate program 142. In some cases, there is a possibility that the self-signed certificate 122 may have been falsely created or otherwise misrepresented. Accordingly, implementations herein may verify that an entity that provides a self-signed certificate 122 is not spoofing. In some examples herein, to solve this problem, the self-signed certificate program 142 uses the TLS certificate 118 (e.g., with organization verification (OV) or extended verification (EV)) in association with the respective self-signed certificate 122. The TLS certificate 118 identifies and certifies the actual entity that is providing the self-signed certificate 122 (e.g., based on the information required for organization certificate verification). The entity's name is also listed in the TLS certificate 118, providing added assurance that both the entity and a corresponding domain and/or website are reputable. Thus, the private self-signed certificate program 142 uses the self-signed certificate 122 with the TLS certificate 118, which indicates that the user-requested certificates and associated entity are genuine.

Figure 2:
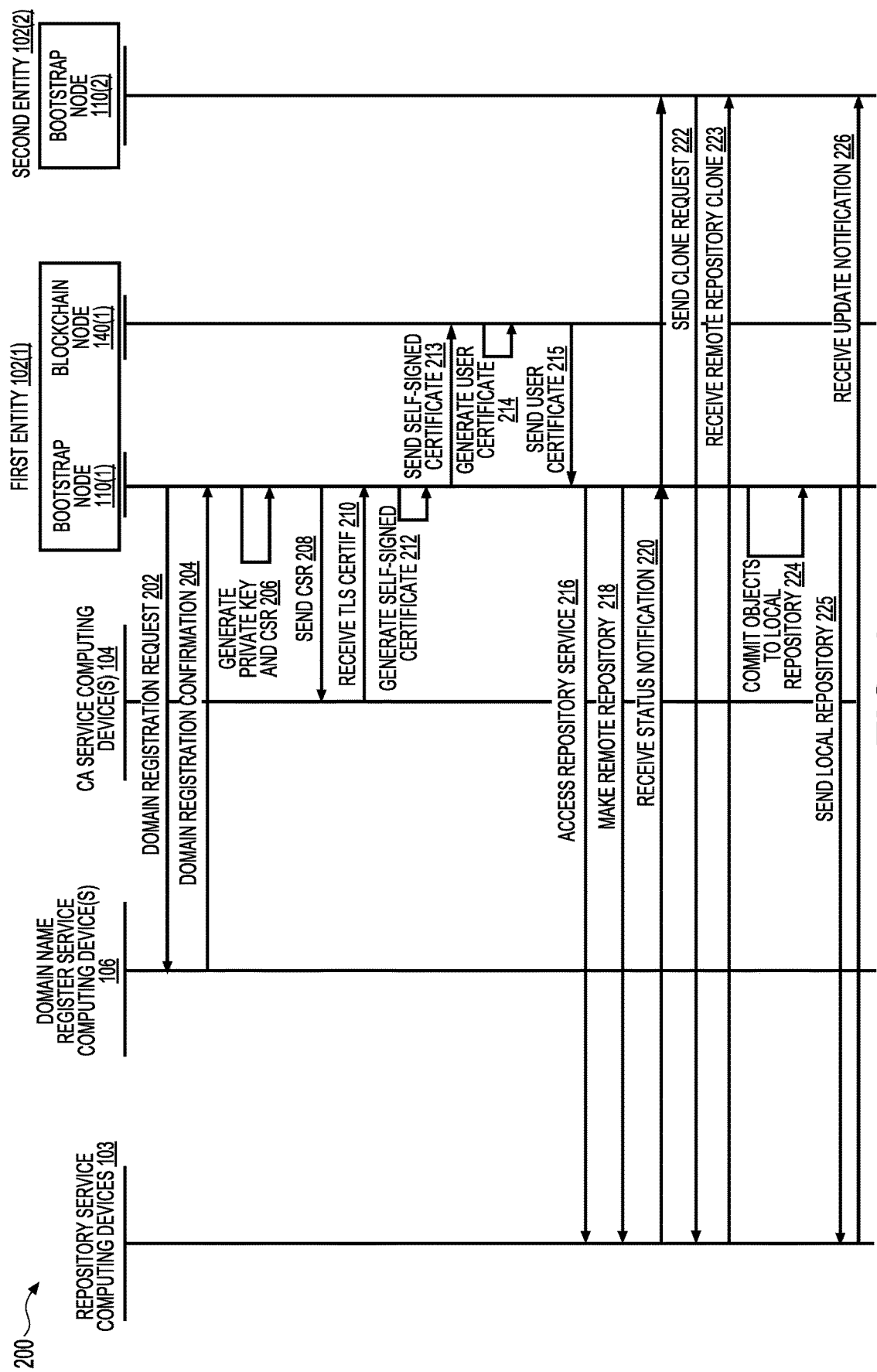
FIG. 2 is a sequence diagram illustrating example processes and interaction of functional components for secure bootstrap of a blockchain network according to some implementations.
Figure 3:
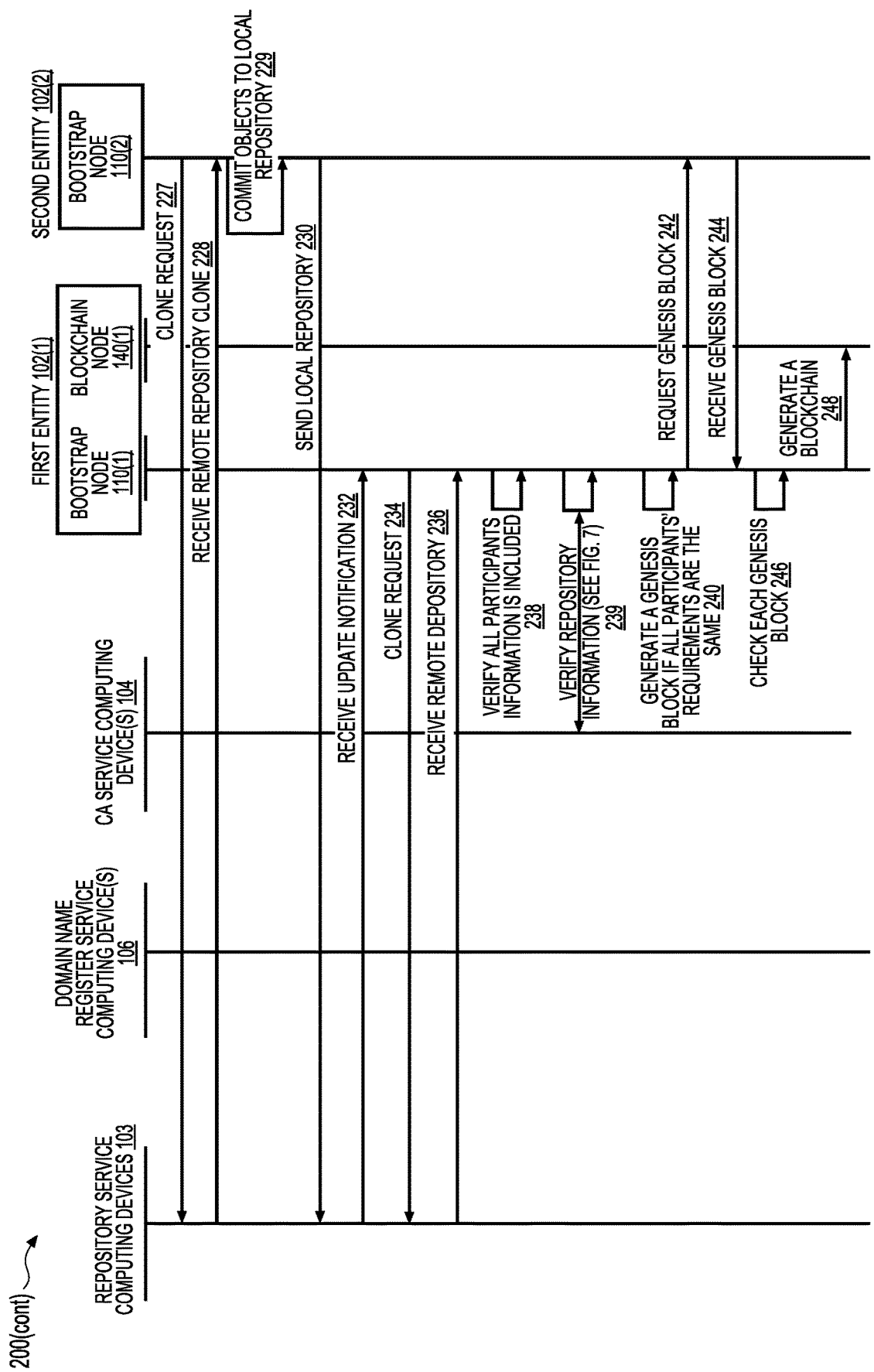
FIG. 3 is a sequence diagram illustrating example processes and interaction of functional components for secure bootstrap of a blockchain network according to some implementations.
Figure 7:
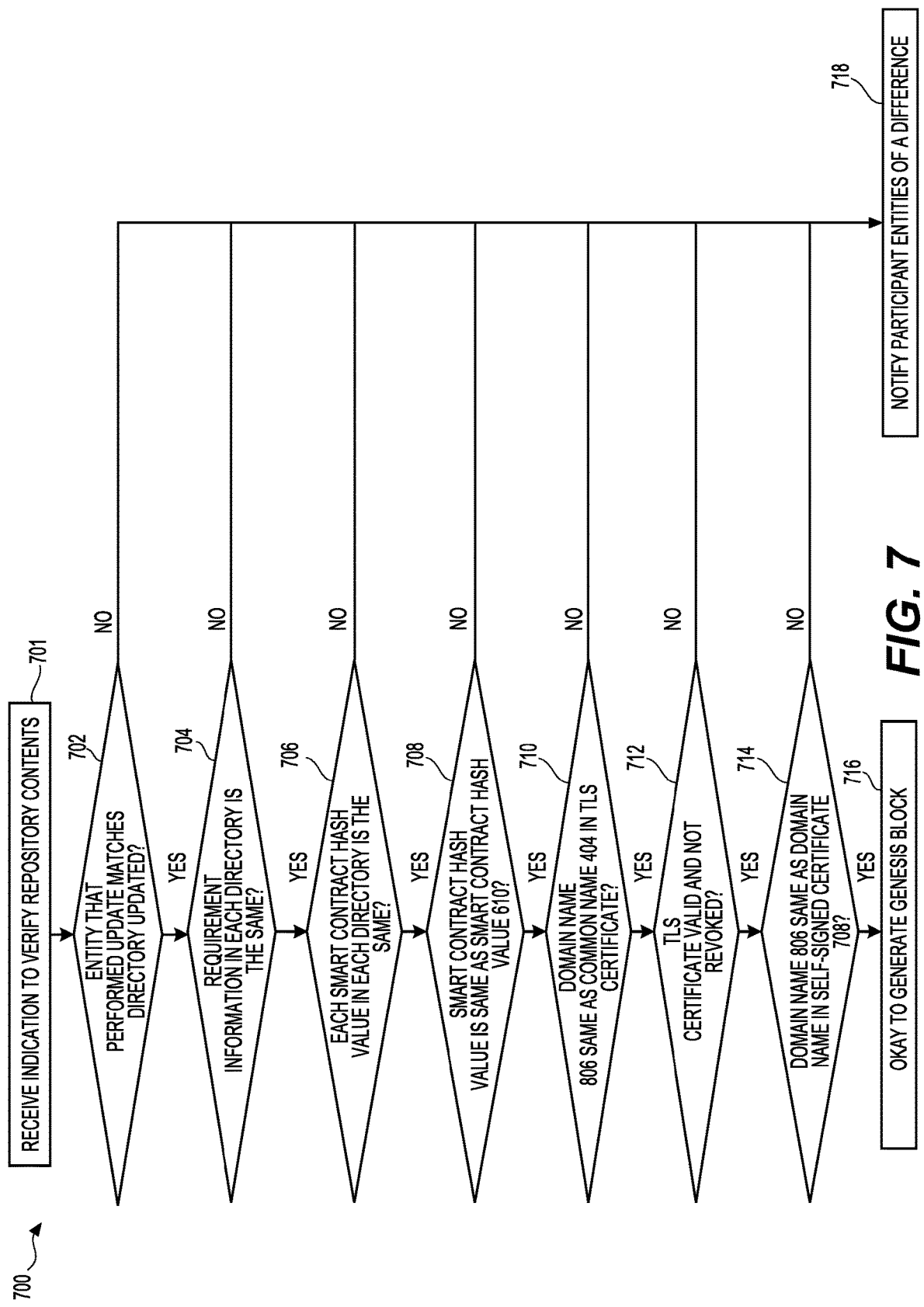
FIG. 7 is a flow diagram illustrating an example process for verifying the contents of the local repository according to some implementations.

FIGS. 2, 3, and 7 illustrate example processes as respective sequences of operations, some or all of which may be implemented in hardware, software, or a combination thereof. In the context of software, the operations may correspond to computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the operations are described should not be construed as a limitation. Any number of the described operations can be combined in any order and/or in parallel to implement the process, or alternative processes, and not all of the operations need be executed. For discussion purposes, the processes are described with reference to the environments, frameworks and systems described in the examples herein, although the processes may be implemented in a wide variety of other environments, frameworks and systems.

FIGS. 2 and 3 are sequence diagrams illustrating example processes and interaction of functional components of the first entity 102(1) and the second entity 102(2) for secure bootstrap of a blockchain network according to some implementations. For instance, in the example process 200 of FIG. 2, suppose that the first entity 102(1) proposes to bootstrap or initialize a blockchain network and participate in the blockchain network with one or more other participating entities such as second entity 102(2). Further, suppose that second entity 102(2) also participates in the process 200 and there may be other entities (e.g., a third entity, a fourth entity, etc.) also participating in the process 200, but the interaction related to the third entity may be generally the same as with the second entity and therefore is not separately illustrated for clarity purposes.

At 202, the bootstrap node 110(1) associated with the first entity 102(1) or another computing device may send a domain name registration request to the domain name registrar service computing device(s) 106 to register one or more domain names associated with the first entity 102(1), such as via a web browser or email communication. The domain name registration request may include one or more of a domain name, a legal name or business organization name of the first entity 102(1), a name of a person requesting registration, an email address, a phone number, and so forth. In some examples, the client program 116(1) may be executed to send the request to the domain name registrar service computing device(s) 106.

At 204, the bootstrap node 110(1) may receive a domain registration confirmation indicating successful registration of the one or more domains associated with the first entity 102(1) in response to the request sent at 202.

At 206, the bootstrap node 110(1) associated with the first entity 102(1) may generate a cryptographic key pair according to public-key cryptography techniques. For example, the cryptographic key pair may include a private cryptographic key and a corresponding public cryptographic key, such as based on RSA (Rivest-Shamir-Adlemand) or other suitable method. In some instances, the bootstrap program 112(1) may use a native toolkit executed on the bootstrap node 110(1), such as OpenSSL, to generate the key pair. The private key 114(1) may be stored by the first entity 102(1). At 206, the bootstrap program 112(1) may also generate the CSR 190(1). The CSR 190(1) is a block of encoded text that is sent to the CA service computing device(s) 104 when applying for an SSL or TLS certificate. As mentioned above, the TLS certificate 118 may employ organization verification or extended verification.

The CSR 190(1) contains information that will be included in the certificate such as the organization name, etc., and also includes the public key 113(1) that will be included in the certificate. The private key 114(1) is the counterpart of the public key 113(1) included in the CSR. In some examples, the CSR may be encoded using ASN.1 according to the PKCS #10 specification. The CA service computing device(s) 104 may use the CSR 190(1) to create the TLS certificate 118(1) discussed above. The TLS certificate created with a particular CSR 190(1) will only work with the private key 114(1) that corresponds to the public key 113(1) with which the TLS certificate was created. The information included in the CSR 190(1) may include one or more of a country name, state or province, locality or city, company name, and organization/entity name of the first entity 102(1), and a common name, which may be the registered domain name(s) associated with the first entity 102(1). In some instances, the information included in the CSR 190(1) matches the information submitted in the domain registration request. Further, in some examples, the CSR 190(1) may be digitally signed using the generated private key 114(1).

At 208, the bootstrap program 112(1) executing on the bootstrap node 110(1) associated with the first entity 102(1) may send or otherwise issue the generated CSR to the CA service computing device(s) 104.

At 210, the bootstrap node 110(1) associated with the first entity 102(1) may receive a TLS certificate from the globally trusted CA service computing device(s) 104. The TLS certificate may be digitally signed by the globally trusted CA service computing device(s) 104 and stored in association with the bootstrap node 110(1) as TLS certificate 118(1).

FIG. 4 illustrates an example data structure of a TLS certificate 118(1) according to some implementations. In this example, a TLS certificate 118 may include information 402 indicating an entity the certificate is issued to, information 410 indicating the entity that the issued the certificate, validity information 418 indicating the time period the certificate is valid and one or more fingerprints or hash values 424. For example, the TLS certificate may indicate the certificate is issued to a common name 404, an organization 406 and a serial number 408. The TLS certificate 118 may also indicate the certificate is issued by a common name 412, an organization 414, and an organizational unit 416. Further, the validity information 418 may indicate an issued date 420 and an expiration date 422. Additionally, the TLS certificate 118 may indicate one or more fingerprints 424, which may include a Secure Hash Algorithm (SHA1) hash value 426 and may include other fingerprints derived from other hash algorithms known to those having skill in the art. Accordingly, the TLS certificate may include the generated public key generated by the first entity 102(1). The self-signed certificate 122 may have a data structure similar to that of the TLS certificate 118, but the self-signed certificate 122 may be signed using the private key of the signing entity, rather than the signing key of the trusted CA authority, and the "Issued To:" and "Issued By" is the same entity.

Returning to FIG. 2, at 212, the bootstrap program 112(1) may execute on the bootstrap node 110(1) associated with the first entity 102(1) to generate a self-signed certificate 122(1) that includes the registered domain name(s) associated with the first entity 102(1). The bootstrap node 110(1) may store the self-signed certificate 122(1). The self-signed certificate 122(1) may use the same public key 113(1) as the TLS certificate 118(1), and thus, the TLS certificate 118(1) may serve to authenticate the self-signed certificate 122(1).

At 213, the bootstrap node 110(1) associated with the first entity 102(1) may send the self-signed certificate 122(1) and TLS certificate 118(1) to the blockchain node 140(1).

At 214, in some instances, the self-signed certificate program 142(1) may start a service that issues user requested certificates based on the self-signed certificate 122(1) to enable interaction with the blockchain. For example, at least partially based on using the same public key as the self-signed certificate 122(1), the TLS certificate 118 provides an indication that the self-signed certificate program 142(1) is executed by the entity identified in the TLS certificate 118. In some examples, the self-signed certificate program 142(1) may execute one or more instances of an open-source system, application, or computing node to generate the user requested certificates based on the self-signed root CA 144(1) corresponding to the self-signed certificate 122(1). As one example, the self-signed certificate program 142(1) may include the KUBERNETES® system, or the like, which is a system for automating development, scaling and management of containerized applications. Further, the bootstrap node 110(1) associated with the first entity 102(1) may send the TLS certificate 118(1) to the blockchain node 140(1). The TLS certificate 118(1) may be used to certify that the self-signed certificate program 142(1) used to generate the user requested certificates is executed by the entity named in the TLS certificate 118(1) and also named in the self-signed certificate 122(1).

At 215, the blockchain node 140(1) associated with the first entity 102(1) may send, to the bootstrap node 110(1) associated with the first entity 102(1), the user requested certificate generated by the self-signed certificate program. The bootstrap node 110(1) may store the user requested certificate.

At 216, the bootstrap node 110(1) associated with the first entity 102(1) may access or interact with the repository service computing device(s) 103 to generate an account, access, or otherwise initially interact with the repository service computing device(s) 103. As one example, the client program 116(1) may be executed on the bootstrap node 110(1) to communicate with the repository service computing device(s) 103 for accessing the remote repository 162. The client program 116(1) may send information to interact with the repository service computing device(s) 103 generate an account. Each participating entity may create its own account with the repository service computing device(s) 103 and may register with the repository service to receive notifications regarding the remote repository. In some instances, the repository service may include a permissionless blockchain and at 216, the client program 116(1) may generate a wallet including a cryptographic key pair including a public key, which may serve as an address for transacting information on the permissionless blockchain. In this instance, the client program 116(1) may distribute the public address to the other participating entities.

Figure 5:
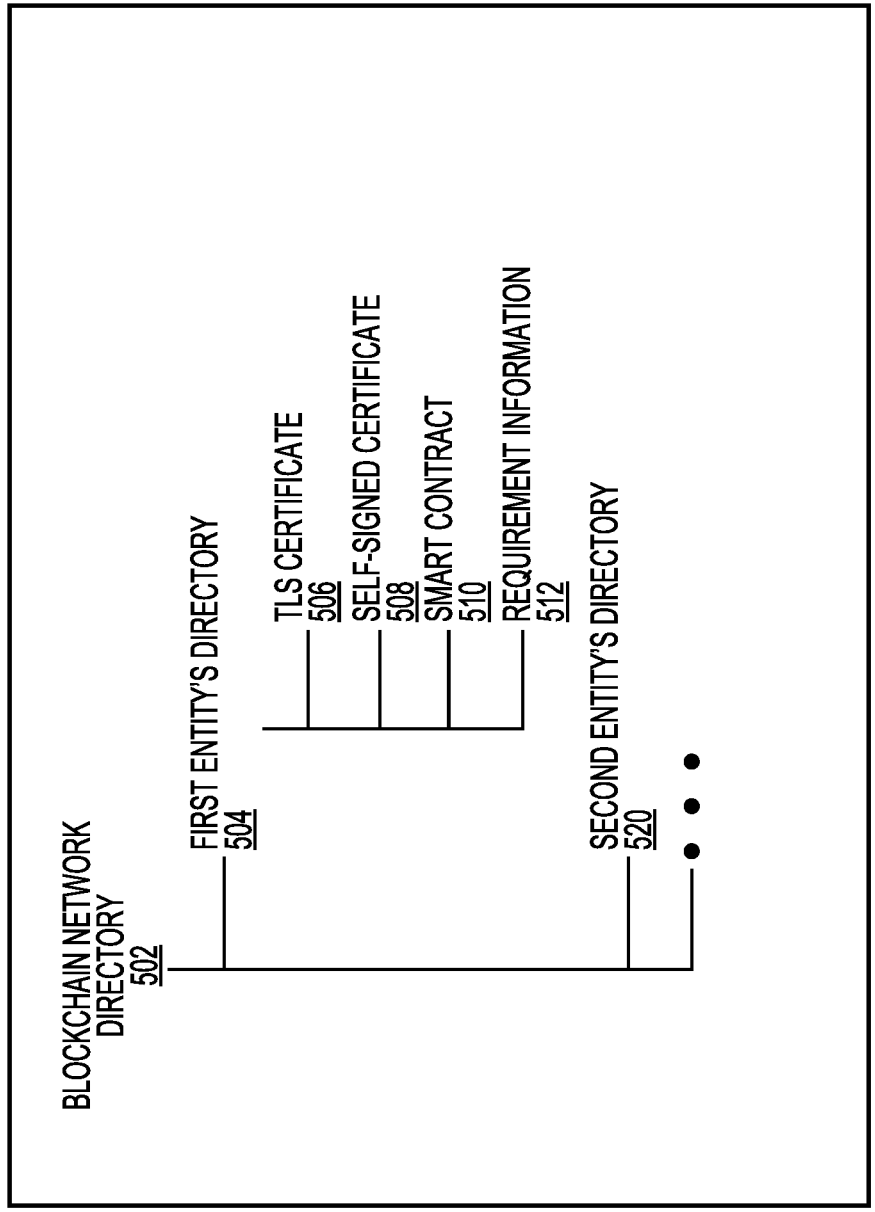
FIG. 5 illustrates an example data structure of a repository according to some implementations.

At 218, the client program 116(1) executing on the bootstrap node 110(1) associated with the first entity 102(1) may build or initiate a remote repository, using code or software compatible with the repository service computing device(s) 103 and the repository may be pushed or otherwise sent to the repository service computing device(s) 103. In some examples, the remote repository initiated at 218 may be a container, designated space or other structure allocated on the repository service computing device(s) 103 for storing files of the first entity 102(1) and the other participating entities (e.g., 102(2)). As will be explained additionally below, an exemplary data structure of a repository according to some implementations is illustrated in FIG. 5.

At 220, the bootstrap node 110(1) may receive status notification based on generating the remote repository. For example, the repository service computing device(s) 103 may send a status notification to at least the first entity 102(1). The status notification may also be received by the other participating entities such as the second entity 102(2). For example, the repository service may have a username and email address for each participating entity that has registered with the repository service. In some cases, participating entities may use a private key 114 when registering to prevent falsification. Additionally, in the case that the remote repository includes a public blockchain, each transaction may have a signature signed by the participant. The status notification may indicate that the remote repository on the repository service computing device(s) 103 is successfully generated based on the repository information generated and sent in operation 218.

At 222, in response to receiving the status notification, the client program 116(2) executing on the bootstrap node 110(2) associated with the second entity 102(2) may send a request to the repository service computing device(s) 103 to receive a copy (clone) of the contents of the remote repository. Other participating entities (not shown in FIG. 2), in response to the status notification, may also send clone requests to the repository service computing device(s) 103 to clone the remote repository.

At 223, in some implementations, a clone of the remote repository that may include a copy of the repository structure and contents may be sent from the repository service computing device(s) 103 and received by the client program 116(2) executing on the bootstrap node 110(2) associated with the second entity 102(2). In addition, any other participants who submitted a clone request may also receive the copy of the repository structure and contents. However, at this point in the process 200, the remote repository is typically empty, so the result of the clone request merely results in all the participants having empty local repositories.

At 224, the bootstrap node 110(1) may commit or otherwise store files or information associated with the first entity 102(1) in the local repository 128(1) of the bootstrap node 110(1). For example, files such as the TLS certificate 118(1), the self-signed certificate 122(1), the smart contract 126(1), and the requirement information 130(1) (e.g., as discussed above with respect to FIGS. 1A and 1B) may be committed or otherwise stored to the local repository 128(1). The files or information associated with the first entity 102(1) stored in the local repository 128(1) in accordance with 224 may occur in a different order than what is shown, such as when the initial repository is generated at 218, for example.

FIG. 5 illustrates an example data structure 500 of a repository according to some implementations. The data structure shown in FIG. 5 is exemplary of the remote repository 161 stored on the repository service computing device(s) 103 and/or the local repository 128 on a respective bootstrap node of a participating entity. In this example, the repository information stored in the data structure 500 may include identification information as a first entity's directory 504, and a second entity's directory 520 identifying each of the participating entities of the blockchain network directory 502, which is a directory including each of the participating entities. The identification information may be a name of an entity such as "First Entity's Directory" 504 in this case, or other identification information such as an identification number.

In some examples, the contents of a particular participating entity's directory 504 may include a TLS certificate file 506, a self-signed certificate 508, smart contract 510, and requirement information 512. For example, with respect to the directory of the first entity 504, the TLS certificate file 506, the self-signed certificate 508, the smart contract 510 and the requirement information 512, may correspond with the TLS certificate 118(1), the self-signed certificate 122(1), the smart contract 126(1), and the requirement information 130(1), respectively, of FIG. 1C.

FIG. 6 illustrates an example data structure of requirement information 130 according to some implementations. FIG. 6 illustrates requirement information in a file format, such as JavaScript Object Notation (hereinafter "JSON"), but another data structure may be used as is appropriate and compatible with the system 100. Further, the structure shown in FIG. 6 is exemplary of the requirement information stored in the remote repository on the repository service computing device(s) 103 and/or requirement information 130 of a local repository 128 on a respective bootstrap node 110 of a participating entity 102. For example, requirement information may include a blockchain network name 602, and for each one or more participants, a participant name 604, a domain name 606 associated with a participant name 604, and permission information 608 indicating authority to read and write data, for example, that is associated with a respective participant name 604. Permission information 608 may be defined by a user or administrator of a respective participating entity. Further, a smart contract hash value 610 of the smart contract 510, which may be associated with the blockchain network, may be included in the requirement information 130.

Returning to FIG. 2, at 225, the client program 116(1) associated with the first entity 102(1) may push, issue, or otherwise send the contents of the local repository 128(1) to the repository service computing device(s) 103. The repository service computing device(s) 103 may receive the local repository 128(1) contents and store the contents in the remote repository, e.g., within a directory of the first entity 102(1).

At 226, the repository service may issue or otherwise send an update notification to the other participating entities, such as second entity 102(2), which indicates an update has occurred to the remote repository at the repository service computing device(s) 103. An update may include a change to the contents of the remote repository, such as an addition or a deletion of data or other information. The repository service computing device(s) 103 may have a function to send updates to entities that have access to the repository service computing device(s) 103 and/or access to the remote repository. Accordingly, if the repository service computing device(s) 103 updates the remote repository, it may send an update notification to one or more of the participating entities. In some implementations the update notification may be sent to the respective bootstrap nodes 110 via API, email, web hook, hypertext transfer protocol (hereinafter "http") callback, or other notification protocol.

Referring to FIG. 3, At 227, in response to receiving the update notification, the bootstrap node 110(2) of the second entity may send a request to the repository service computing device(s) 103 to receive a copy (clone) of the contents of the remote repository. Other participating entities (not shown in FIG. 3) may also send clone requests to the repository service computing device(s) 103 to obtain a copy of the contents of the remote repository.

At 228, the bootstrap node 110(2) of the second entity may receive, from the repository service computing device(s) 103, a clone of the remote repository that may include a copy of the repository structure and contents. For example, the clone may be received by the client program 116(2) associated with the second entity 102(2). Any other participants who submitted a clone request may also receive the clone of the remote repository. Thus, the local repositories of the participants may all include the objects stored by the first entity to its local repository and sent to the remote repository.

At 229, the bootstrap node 110(2) of the second entity may commit or otherwise store files, objects, or other information associated with the second entity 102(2) in a local repository of the second entity. For example, files such as the TLS certificate 118(2), self-signed certificate 122(2), smart contract 126(2), and requirement information 130(2) may be committed or otherwise stored to the local repository 128(2), e.g., as discussed above with respect to FIGS. 1A-1C.

At 230, the client program 116(2) executing on the bootstrap node 110(2) associated with the second entity 102(2) may send its local repository 128(2) to the repository service computing device(s) 103, thereby updating the remote repository. The repository service computing device(s) 103 may update the remote repository based on the contents of the local repository 128(2) sent from the second entity 102(2). At this point, the local repository 128(2) associated with the second entity 102(2) and the remote repository have the information associated with the first entity 102(1) and the information associated with the second entity 102(2), while the local repository of the first entity 102(1) may only have the information associated with the first entity 102(1).

At 232, the repository service computing device(s) 103 may issue or otherwise send an update notification to the other participating entities, such as first entity 102(1), that indicates an update to the remote repository on the repository service computing device(s) 103.

At 234, in response to receiving the update notification from the repository service computing device(s) 103, the client program 116(1) on the bootstrap node 110(1) associated with the first entity 102(1) may issue or otherwise send a request to receive a copy of the contents of the remote repository from the repository service computing device(s) 103.

At 236, in response to receiving the clone request from the bootstrap node 110(1), the repository service computing device(s) 103 may send the contents of the remote repository to the bootstrap node 110(1) of the first entity 102(1). Once received, the client program 116(1) may update the local repository 128(1) based on the contents received from the repository service computing device(s) 103. The requirement information cloned from the remote repository may be stored to the requirement information 130(1).

At 238, the bootstrap node 110(1) associated with the first entity 102(1) may verify that the requirement information 130(1) includes information for each participating entity. For example, the bootstrap program 112(1) on the bootstrap node 110(1) may check that a participant name 604, a domain name 606, and a permission 608 exists for each participating entity. If not, then the bootstrap program 112(1) and/or the client program 116(1) waits for another update notification from the repository service computing device(s) 103 and subsequently the client program 116(1) will send another clone request and receive another clone of the repository according to the above processes.

At 239, after the bootstrap node 110(1) verifies that the requirement information 130(1) includes all requirement information for each of the participating entities, the bootstrap program 112(1) checks or verifies each item of information of each participating entity in the local repository 128(1) (including the requirement information 130(1)) by executing a verification process 700. In some examples, each of the bootstrap nodes 110 of each of the participating entities 102 may perform the verification following an update to the remote repository. For instance, if a participating entity 102 pushes a local repository to the remote repository, the other participants receive a notification (e.g., as discussed at 226 and 232). After receiving the notification, each participant may clone the remote repository and execute the bootstrap program 112 for performing the verification process. Accordingly, in some cases, the verification process may be executed every time a repository update notification is received.

FIG. 7 is a flow diagram illustrating an example verification process 700 for verifying the contents of the local repository according to some implementations. The verification process 700 may be executed by each bootstrap node 110, such as by executing the node's respective bootstrap program 112 or other suitable software or algorithm.

At 701, the bootstrap node 110(1) may receive an indication to verify the repository contents, such as based on determining that all participating entities have sent their respective entity objects or other information (e.g., TLS certificate 118, self-signed certificate 122, smart contract 126, and requirement information 130) to the remote repository.

At 702, the bootstrap node 110(1) verifies that the entity that performed an update to a directory at the repository is the entity that corresponds to the directory that was updated. For example, the bootstrap node 110(1) may check the TLS certificate in the entity's directory 504 and a corresponding digital signature. As mentioned above, participating entities may use a private key 114 when registering with the remote repository service to prevent falsification by other entities. Additionally, in the case that the remote repository includes a public blockchain, each transaction has a signature signed by the participant of the transaction. Accordingly, the operation at 702 may ensure that each participating entity's directory 504 at the remote repository is undated only by that participating entity. This check may be performed for each directory 504 of each participating entity 102.

At 704, the bootstrap node 110(1) verifies whether the requirement information 512 in each participant directory 504 is the same. For example, the bootstrap node 110(1) may check that the participant name 604, domain name 606, and permission information 608 in each participating entity's requirement information 130 stored in the local repository 128 is the same. If not, then the bootstrap node 110(1) notifies users of the difference(s). For example, the bootstrap node 110(1) may check the domain name 606 of the requirement information stored in first entity 102(1)'s directory 504 in the local repository 128(1) to make sure it matches the domain name 606 of the requirement information stored in the directory 520 of the second entity 102(2) in the local repository 128(1).

At 706, the bootstrap node 110(1) verifies that each hash value of each smart contract 510 in each participating entity's directory is the same. For example, the bootstrap node 110(1) may verify that a hash value of the smart contract 510 in the first entity's directory 504 is the same as a hash value of a smart contract in the second entity's directory 520.

At 708, the bootstrap node 110(1) verifies that the smart contract hash value 610 of the requirement information 512 is the same as the hash value of the smart contract 510. The bootstrap node 110(1) may execute the operation at 706 for each participating entity directory of the local repository 128(1).

At 710, the bootstrap node 110(1) verifies that the domain name 606 is the same as common name 404 of the TLS certificate 506. The bootstrap node 110(1) may execute the operation at 708 for each participating entity directory of the local repository 128(1).

At 712, the bootstrap node 110(1) verifies that the TLS certificate 506 is valid and not revoked by the globally trusted CA service computing device(s) 104 or other certificate authority, such as an intermediate certificate authority. The bootstrap node 110(1) may verify the TLS certificate by verifying that the current date is not past the expiration date 422 for example. As one example, the TLS certificate may include the issuer public key. An issuer (e.g., the globally trusted CA) may have released the public key. Accordingly, the bootstrap node 110(1) may compare the issuer public key of the TLS certificate and issuer public key obtained from issuer's website to verify the validity of the TLS certificate. The bootstrap node 110(1) may execute process 710 for each participating entity directory of the local repository 128(1).

At 714, the bootstrap node 110(1) verifies that the domain name 606 in the requirement information 512 is the same as the domain name in the self-signed certificate 508.

At 716, the result of the verification process 700 may be an indication to proceed with generation of the genesis block.

At 718, on the other hand, if any of the verification operations indicate that compared items are not the same in any of 704, 706, 708, 710, and 714, or that the TLS certificate 506 is revoked or is otherwise not valid at 710 (i.e., "No" in FIG. 7), then the bootstrap node 110(1) may notify other participating entities of a difference between any of the compared items. For example, if the hash value of the smart contract 510 is not the same as smart contract hash value 610 in the requirement information 512, then the bootstrap node 110(1) may notify the second entity 102(2) that there is a mismatch or a difference.

Returning to FIG. 3, at 240, the bootstrap node 110(1) associated with first entity 102(1) may generate a genesis block. For example, the bootstrap program 112(1) may be executed by the bootstrap node 110(1) to generate the genesis block. The genesis block may include information regarding all participants' self-signed certificates 122 and the permission information 608 from the requirement information 130. Further, although not shown in FIG. 3, in some implementations, each participating entity may generate their own genesis block according to operation 240, e.g., as discussed above with respect to FIGS. 1A-1C.

FIG. 8 illustrates an example data structure 800 of a genesis block 127 according to some implementations. For example, the genesis block 127 may include a blockchain network name 802, one or more participant names 804, a domain name 806 associated with each participant name 804, permission information 808 indicating authority to read and write data associated with a participant name 804, and the respective self-signed certificate 810 of each participant. Further, while certain contents of the genesis block 127 are illustrated in this example, the genesis block may including additional content as will be apparent to those of skill in the art having the benefit of the disclosure herein.

Returning to FIG. 3, at 242, the bootstrap node 110(1) associated with the first entity 102(1) may request a genesis block generated by the other entities 102, similar to that generated at 240, from each of the other participating entities 102, such as the second entity 102(2) in this example.

At 244, the bootstrap node 110(1) receives the generated genesis block from the second entity 102(2) and any other participating entities. The received genesis block may be stored on the bootstrap node 110(1) and/or the blockchain node 140(1).

At 246, the bootstrap node 110(1) may compare a hash value of each genesis block received with a hash value of the genesis block generated at 240. For example, the bootstrap node 110(1) may generate a hash value of each genesis block using a hash algorithm, such as SHA256 or SHA1.

At 242, if there are no inconsistencies in the genesis blocks, the blockchain node 140(1) may be instructed by the bootstrap node 110(1) to execute the blockchain program 150(1) to generate at least a portion of a blockchain network based on the generated genesis block. For example, the genesis block may be the first block in the generated blockchain and the blockchain program 150(1) may be executed to run and manage the generated blockchain. On the other hand, if there is an inconsistency, the blockchain and/or blockchain network is not initiated, and a notification is sent to the participating entities.

The example processes described herein are only examples of processes provided for discussion purposes. Numerous other variations will be apparent to those of skill in the art in light of the disclosure herein. Additionally, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 9:
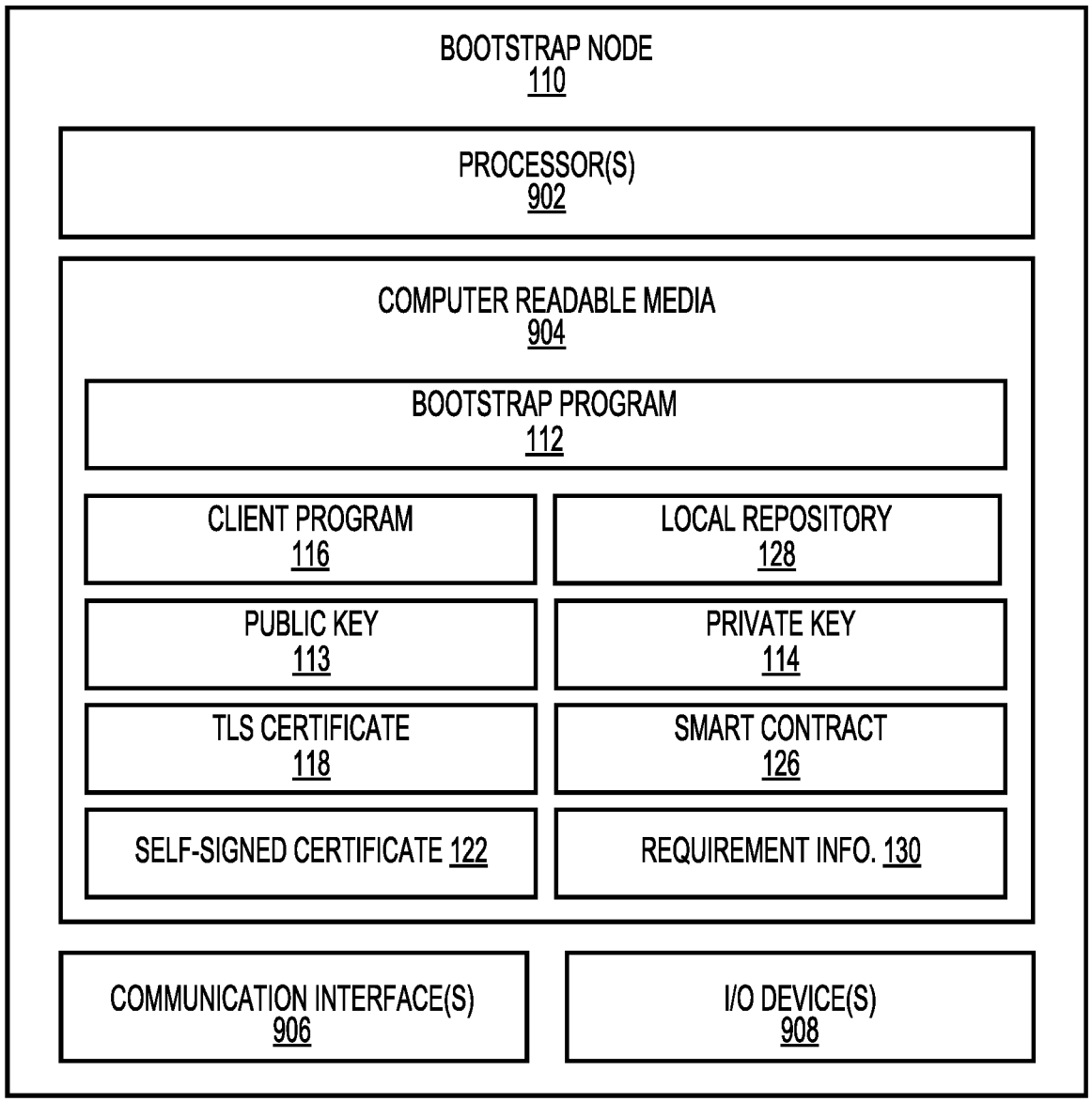
FIG. 9 illustrates an example architecture of a bootstrap node according to some implementations.

FIG. 9 illustrates select components of one or more example bootstrap node computing devices 110 that may be used to implement some functionality of the services described herein. The bootstrap node 110 may include one or more servers or other types of computing devices that may be embodied in any number of ways. For instance, in the case of a server, the programs, other functional components, and data may be implemented on a single server, a cluster of servers, a server farm or data center, a cloud-hosted computing device, a virtual machine hosting computing device, and so forth, although other computer architectures may additionally or alternatively be used.

Further, while the figures illustrate the functional components and data of the bootstrap node 110 as being present in a single location, these components and data may alternatively be distributed across different computing devices and different locations in any manner. Consequently, the functions may be implemented by one or more computing devices, with the various functionality described above distributed in various ways across the different computing devices. Multiple bootstrap nodes 110 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each bootstrap node 110 may include one or more processors 902, one or more computer-readable media 904, one or more communication interfaces 906, and one or more input/output (I/O) devices 908. Each processor 902 may be a single processing unit or a number of processing units, and may include single or multiple computing units or multiple processing cores. The processor(s) 902 can be implemented as one or more microprocessors, microcomputers, microcontrollers, digital signal processors, central processing units, state machines, logic circuitries, and/or any devices that manipulate signals based on operational instructions. For instance, the processor(s) 902 may be one or more hardware processors and/or logic circuits of any suitable type specifically programmed or configured to execute the algorithms and processes described herein. The processor(s) 902 can be configured to fetch and execute computer-readable instructions stored in the computer-readable media 904, which can program the processor(s) 902 to perform the functions described herein.

The computer-readable media 904 may include volatile and nonvolatile memory and/or removable and non-removable media implemented in any type of technology for storage of information, such as computer-readable instructions, data structures, program modules, or other data. Such computer-readable media 904 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the bootstrap node 110, the computer-readable media 904 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 904 may be used to store any number of functional components that are executable by the processors 902. In many implementations, these functional components comprise instructions or programs that are executable by the processors 902 and that, when executed, specifically configure the one or more processors 902 to perform the actions attributed above to the bootstrap node 110. Functional components stored in the computer-readable media 904 may include the bootstrap program 112 and the client program 116. Additional functional components stored in the computer-readable media 904 may include an operating system (not shown) for controlling and managing various functions of the bootstrap node 110.

In addition, the computer-readable media 904 may store data used for performing the operations described herein. Thus, the computer-readable media 904 may include the local repository 128, and may further store the public key 113, the private key 114, the TLS certificate 118, the smart contract 126, the self-signed certificate 122, and the requirement information 130. In addition, the computer-readable media 904 may store or otherwise maintain other functional components and data not specifically shown in FIG. 9, which may include programs, drivers, etc., and the data used or generated by the functional components. Further, the bootstrap node 110 may include many other logical, programmatic, and physical components, of which those described above are merely examples that are related to the discussion herein.

The communication interface(s) 906 may include one or more interfaces and hardware components for enabling communication with various other devices, such as over the network(s) 108. For example, communication interface(s) 906 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The bootstrap node 110 may further be equipped with various input/output (I/O) devices 908. Such I/O devices 908 may include a display, various user interface controls (e.g., buttons, joystick, keyboard, mouse, touch screen, etc.), audio speakers, connection ports and so forth.

Figure 10:
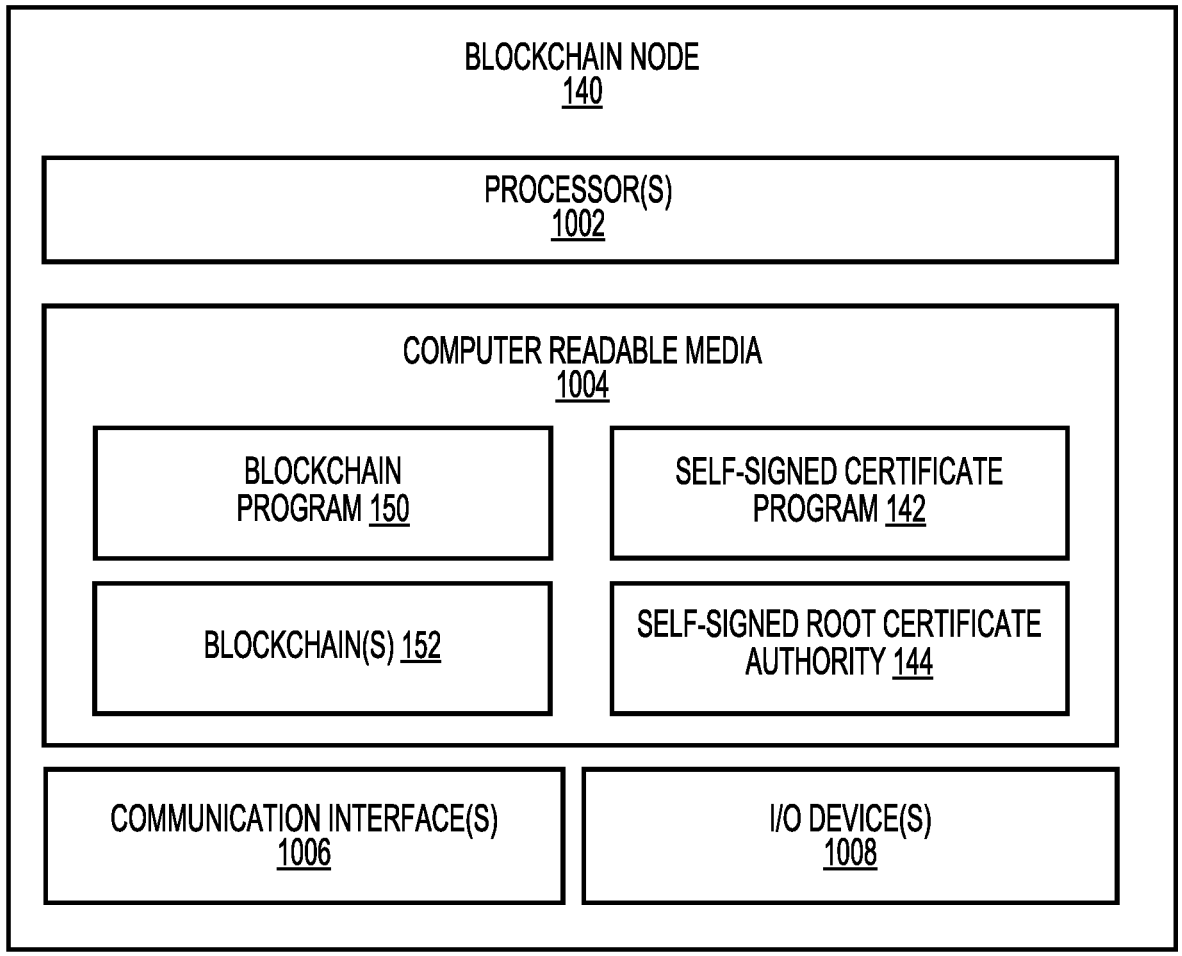
FIG. 10 illustrates an example architecture of a blockchain node according to some implementations.

FIG. 10 illustrates select components of one or more example blockchain node computing devices 140 that may be used to implement some functionality of the services described herein. The blockchain node 140 may include one or more servers or other types of computing devices that may be embodied in any number of ways. For instance, in the case of a server, the programs, other functional components, and data may be implemented on a single server, a cluster of servers, a server farm or data center, a cloud-hosted computing device, a virtual machine hosting computing device, and so forth, although other computer architectures may additionally or alternatively be used.

Further, while the figures illustrate the functional components and data of the blockchain node 140 as being present in a single location, these components and data may alternatively be distributed across different computing devices and different locations in any manner. Consequently, the functions may be implemented by one or more blockchain nodes 140, with the various functionality described above distributed in various ways across the different computing devices. Multiple blockchain nodes 140 may be located together or separately, and organized, for example, as virtual servers, server banks, and/or server farms. The described functionality may be provided by the servers of a single entity or enterprise, or may be provided by the servers and/or services of multiple different entities or enterprises.

In the illustrated example, each blockchain node 140 may include one or more processors 1002, one or more computer-readable media 1004, one or more communication interfaces 1006, and one or more input/output (I/O) devices 1008. Each processor 1002 may be a single processing unit or a number of processing units, and may include single or multiple computing units or multiple processing cores. The processor(s) 1002 can be implemented as one or more microprocessors, microcomputers, microcontrollers, digital signal processors, central processing units, state machines, logic circuitries, and/or any devices that manipulate signals based on operational instructions. For instance, the processor(s) 1002 may be one or more hardware processors and/or logic circuits of any suitable type specifically programmed or configured to execute the algorithms and processes described herein. The processor(s) 1002 can be configured to fetch and execute computer-readable instructions stored in the computer-readable media 1004, which can program the processor(s) 1002 to perform the functions described herein.

The computer-readable media 1004 may include volatile and nonvolatile memory and/or removable and non-removable media implemented in any type of technology for storage of information, such as computer-readable instructions, data structures, program modules, or other data. Such computer-readable media 1004 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the blockchain node 140, the computer-readable media 1004 may be a type of computer-readable storage media and/or may be a tangible non-transitory media to the extent that when mentioned herein, non-transitory computer-readable media exclude media such as energy, carrier signals, electromagnetic waves, and signals per se.

The computer-readable media 1004 may be used to store any number of functional components that are executable by the processors 1002. In many implementations, these functional components comprise instructions or programs that are executable by the processors 1002 and that, when executed, specifically configure the one or more processors 1002 to perform the actions attributed above to the blockchain node 140. Functional components stored in the computer-readable media 1004 may include the blockchain program 150 and the self-signed certificate program 142. Additional functional components stored in the computer-readable media 1004 may include an operating system (not shown) for controlling and managing various functions of the blockchain node 140.

In addition, the computer-readable media 1004 may store data used for performing the operations described herein. Thus, the computer-readable media 1004 may store the blockchain(s) 152. Further, the computer-readable media may store the self-signed root certificate authority 144. In addition, the computer-readable media 1004 may store or otherwise maintain other functional components and data not specifically shown in FIG. 10, which may include programs, drivers, etc., and the data used or generated by the functional components. Further, the blockchain node 140 may include many other logical, programmatic, and physical components, of which those described above are merely examples that are related to the discussion herein.

The communication interface(s) 1006 may include one or more interfaces and hardware components for enabling communication with various other devices, such as over the network(s) 130. For example, communication interface(s) 1006 may enable communication through one or more of the Internet, cable networks, cellular networks, wireless networks (e.g., Wi-Fi) and wired networks (e.g., fiber optic and Ethernet), as well as close-range communications, such as BLUETOOTH®, BLUETOOTH® low energy, and the like, as additionally enumerated elsewhere herein.

The blockchain node 140 may further be equipped with various input/output (I/O) devices 1008. Such I/O devices 1008 may include a display, various user interface controls (e.g., buttons, joystick, keyboard, mouse, touch screen, etc.), audio speakers, connection ports and so forth.

Various instructions, methods, and techniques described herein may be considered in the general context of computer-executable instructions, such as computer programs and applications stored on computer-readable media, and executed by the processor(s) herein. Generally, the terms program and application may be used interchangeably, and may include instructions, routines, modules, objects, components, data structures, executable code, etc., for performing particular tasks or implementing particular data types. These programs, applications, and the like, may be executed as native code or may be downloaded and executed, such as in a virtual machine or other just-in-time compilation execution environment. Typically, the functionality of the programs and applications may be combined or distributed as desired in various implementations. An implementation of these programs, applications, and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
a first computing device of a first entity able to communicate with a second computing device, a certificate authority (CA) service computing device, and a repository service computing device over one or more networks, the first computing device including one or more processors configured by executable instructions to perform operations comprising:
receiving, from the CA service computing device, a first digital certificate;
generating a first self-signed certificate associated with the first digital certificate based on a same public key as the first digital certificate;
storing the first digital certificate and the first self-signed certificate in a repository associated with the repository service computing device;
receiving a notification indicating an update by a third computing device of a second entity to contents of the repository associated with the repository service computing device;
receiving a copy of the contents of the repository associated with the repository service computing device, the received contents including at least a second digital certificate and a second self-signed certificate provided by the second entity;
verifying the contents of the repository; and
generating a first genesis block of a blockchain based on a result of the verifying of the contents of the repository, wherein the second computing device interacts with the blockchain based on the generated first genesis block.

2. The system as recited in claim 1, wherein:
the repository associated with the repository service computing device includes first requirement information of the first entity, the first digital certificate, the first self-signed certificate, the second digital certificate, the second self-signed certificate, and second requirement information provided by the second entity; and the operation of verifying the contents of the repository includes at least one of:
verifying that the first requirement information is the same as the second requirement information, or
verifying the second digital certificate is valid.

3. The system as recited in claim 2, wherein the first requirement information includes at least one of:
a name of the blockchain network, a name of the first entity, a domain name of the first entity, a name of the second entity, a domain name of the second entity, or a smart contract hash value.

4. The system as recited in claim 1, wherein:
the third computing device of the second entity receives an update notification from the repository service computing device indicating that the contents of the repository associated with the repository service computing device have been updated; and
in response to receiving the update notification, the third computing device sends the second digital certificate and the second self-signed certificate for being included in the contents in the repository associated with the repository service computing device.

5. The system as recited in claim 1, wherein:
the blockchain includes the generated first genesis block as a first block in the blockchain;
the blockchain is a permissioned blockchain; and
the first entity and the second entity are participants of a blockchain network that manages the permissioned blockchain.

6. The system as recited in claim 1, wherein:
the repository associated with the repository service computing device includes a first smart contract hash value provided by the first computing device and a second smart contract hash value provided by the third computing device of the second entity; and
verifying the contents of the repository by the first computing device includes verifying that the first smart contract hash value is the same as the second smart contract hash value.

7. The system as recited in claim 1, wherein:
the first computing device receives a second genesis block from the third computing device of the second entity;
the first computing device verifies that a hash value of the first genesis block and a hash value of the second genesis block are the same; and
the blockchain is implemented based at least partially upon verifying that the hash value of the first genesis block and the hash value of the second genesis block are the same.

8. The system as recited in claim 1, wherein the repository service computing device includes a web-based storage as the repository, that receives data from each of the first computing device and the third computing device.

9. The system as recited in claim 1, wherein the repository service computing device provides access to a permissionless blockchain as the repository.

10. A method comprising:
receiving, by a first computing device of a first entity, a first digital certificate from a certificate authority service computing device;
generating, by the first computing device, a first self-signed certificate associated with the first digital certificate;
sending, by the first computing device, the first digital certificate and the first self-signed certificate for storage in a repository associated with a repository service computing device;

receiving, by the first computing device, a notification indicating an update by a computing device of a second entity to contents of the repository associated with the repository service computing device;

receiving, by the first computing device, the contents of the repository associated with the repository service computing device, the received contents including at least a second digital certificate and a second self-signed certificate associated with the second entity;

verifying, by the first computing device, the contents of the repository; and generating, by the first computing device, a first genesis block of a blockchain based on a result of the verifying of the contents of the repository.

11. The method as recited in claim 10, wherein:

the repository associated with the repository service computing device includes first requirement information of the first entity, the first digital certificate, the first self-signed certificate, the second digital certificate, the second self-signed certificate, and second requirement information provided by the second entity; and verifying the contents of the repository includes at least one of:
 verifying that the first requirement information is the same as the second requirement information, or
 verifying the second digital certificate is valid.

12. The method as recited in claim 11, wherein the first requirement information includes at least one of:

a name of the blockchain network, a name of the first entity, a domain name of the first entity, a name of the second entity, a domain name of the second entity, or a smart contract hash value.

13. The method as recited in claim 10, wherein:

the computing device of the second entity receives an update notification from the repository service computing device indicating that the contents of the repository associated with the repository service computing device have been updated; and in response to receiving the update notification, the computing device of the second entity sends the second digital certificate and the second self-signed certificate for being included in the contents in the repository associated with the repository service computing device.

14. The method as recited in claim 10, wherein:

the blockchain includes the first genesis block as a first block in the blockchain;

the blockchain is a permissioned blockchain; and the first entity and the second entity are participants of a blockchain network that manages the permissioned blockchain.

15. The method as recited in claim 10, wherein:

the repository associated with the repository service computing device includes a first smart contract hash value provided by the first computing device and a second smart contract hash value provided by the computing device of the second entity; and verifying the contents of the repository by the first computing device includes verifying that the first smart contract hash value is the same as the second smart contract hash value.

16. The method as recited in claim 10, further comprising:

receiving, by the first computing device, a second genesis block from the computing device of the second entity; and verifying, by the first computing device, that contents of the first genesis block and the second genesis block are the same.

17. The method as recited in claim 10, wherein the repository service computing device includes a web-based storage as the repository, that receives data from each of the first computing device and the third computing device.

18. The method as recited in claim 10, wherein the repository service computing device provides access to a permissionless blockchain as the repository.

19. A system comprising:

a first computing device of a first entity able to communicate with a certificate authority (CA) service computing device and a repository service computing device over one or more networks, the first computing device including one or more processors configured by executable instructions to perform operations comprising:

receiving, from a CA service computing device, a first digital certificate;

generating or receiving a first self-signed certificate associated with the first digital certificate;

storing the first digital certificate and the first self-signed certificate in a repository associated with the repository service computing device, wherein the repository includes a permissionless blockchain;

storing the first digital certificate and the first self-signed certificate in the repository on the permissionless blockchain;

receiving a notification indicating an update by a computing device of a second entity to contents of the repository;

using a smart contract to verify the contents of the repository; and generating a genesis block of a blockchain based on a result of the verifying of the contents of the repository.

20. The system as recited in claim 19, wherein:

the repository associated with the repository service computing device includes first requirement information of the first entity, the first digital certificate, the first self-signed certificate, the second digital certificate, the second self-signed certificate, and second requirement information provided by the second entity; and the operation of verifying the contents of the repository includes:
 verifying that the first requirement information is the same as the second requirement information, and
 verifying the second digital certificate is valid.

* * * * *